US012808997B2

(12) United States Patent
Albelo

(10) Patent No.: US 12,808,997 B2
(45) Date of Patent: Nov. 24, 2026

(54) VEHICLE INTEGRATED LIDAR RECEIVER AND METHOD OF USE

(71) Applicant: Jeffrey Albelo, Beaverton, OR (US)

(72) Inventor: Jeffrey Albelo, Beaverton, OR (US)

( * ) Notice: Subject to any disclaimer, the term of this patent is extended or adjusted under 35 U.S.C. 154(b) by 1219 days.

(21) Appl. No.: 17/824,733

(22) Filed: May 25, 2022

(65) Prior Publication Data

US 2026/0202516 A1 Jul. 16, 2026

Related U.S. Application Data

(63) Continuation-in-part of application No. 16/796,187, filed on Feb. 20, 2020, now Pat. No. 11,491,578, and a continuation-in-part of application No. 16/685,715, filed on Nov. 15, 2019, now Pat. No. 11,449,069, and a continuation-in-part of application No. 16/441,867, filed on Jun. 14, 2019, now Pat. No. 11,422,430.

(51) Int. Cl.

| | |
|---|---|
| ***G01S 7/481*** | (2006.01) |
| ***G01S 17/931*** | (2020.01) |

(52) U.S. Cl.

CPC .......... *G01S 7/4817* (2013.01); *G01S 17/931* (2020.01)

(58) Field of Classification Search

None

See application file for complete search history.

(56) References Cited

U.S. PATENT DOCUMENTS

| | | | | |
|---|---|---|---|---|
| 11,422,430 B2 * | 8/2022 | Albelo | .................... | G02F 1/292 |
| 2007/0122155 A1 * | 5/2007 | Hillis | .................... | H01Q 3/2676 398/115 |

* cited by examiner

*Primary Examiner* — Luke D Ratcliffe
(74) *Attorney, Agent, or Firm* — Mark S Hubert

(57) ABSTRACT

A method of using a light beam steering transmissive and reflective element with an arbitrarily sized aperture comprising at least one layer of a insulating matrix modified for increased polarizability under electrical, magnetic or optical stimulation, between two or more substrates that can be electrically configured to provide signal modulation (optical, magnetic or electrical) that will control the wave fronts of incident light, thereby taking off-axis electromagnetic signals and aligning them to the aperture of a receiving element positioned near the device, or the reverse, sending signals originating behind the steering device to a variety of user-defined angles in two or more dimensions.

19 Claims, 21 Drawing Sheets

VEHICLE INTEGRATED LIDAR RECEIVER AND METHOD OF USE

PRIORITY

This application is a continuation in part of US Utility application Ser. No. 16/441,867 filed Jun. 14, 2019 and entitled "Apparatus and Method for Beam Scanner." It is a continuation in part of US Utility application Ser. No. 16/685,715 filed Nov. 15, 2019 and entitled "Apparatus and Method for Beam Scanner." It is a continuation in part of US Utility application Ser. No. 16/796,187 filed Feb. 20, 2020 and entitled "High Speed, Solid State Micromachining Device".

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to a vision system for the transmission and reception of LIDAR signals, and more particularly directed for use in the navigation systems of autonomous vehicles.

BACKGROUND

Autonomous vehicles are now reality on the battlefield and widespread acceptance and implementation are on the immediate horizon in other theaters of operation. The accuracy and precision of these self-driving systems depend upon the footprint or map of the area and objects in the vicinity of the vehicle whether moving or stationary. For optimal performance and safety, the field of view seen should be as wide as possible and should be able to be sampled at an extremely high frequency.

All autonomous vehicles have three cooperating systems. The vision system, which senses and interprets the distance between objects and the vehicle, the analytics system, which receives the visions system's constantly updating signals and performs speed and distance analysis via its software algorithms to generate a picture of the surrounding environment, and the control architecture system which receives inputs from the analytics system and converts them into mechanical actions of the vehicle such as steering, braking and acceleration.

The prior art vision systems vary in their theory of operation, however all transmit a signal and receive a reflected signal from which a composite image of size, shape and distance is compiled. It is this signal that is sent further to the analytics system for processing to generate vehicle control outputs to the control architecture system to safely guide the vehicle. Commonly utilized automobile vision systems embody electromagnetic radiation signals, such as can be found in LIDAR (Google), Radar (Tesla) and multi wavelength composite imaging (various small startup companies). All of these utilize some type of microprocessors running image processing software as part of the analytic system. However, none of these are particularly well suited to operating the self-driving vehicle with any degree of safety for two reasons: First, the frequency of their scans is too low, and second, their field of regard (also called instantaneous field of view, IFOV) is limited. This is also the case for unmanned aerial vehicles (UAVs) and semi- or fully autonomous driver assistants (ADA) presently in use.

While it may be theoretically possible to modify the current prior art systems to have a higher scan frequency and a larger field of regard, this would require a substantial input of energy as these systems utilize mechanical beam steering elements that operate either through movable deflection, MEMS devices or small rotating mirrors (galvanometer and rotating polygon systems). Any improved systems would have to be physically larger (and heavier), and would require much faster movement of the equipment to accomplish the desired, faster scan rate; this is a serious detriment to all vehicles, especially those that are fully electric.

Henceforth, an improved vision system of self-driving vehicles, having a low power consumption, a large field of regard (as close to 180 degrees in flat applications and 360 degrees in cylindrical applications), and extremely fast scan speeds (in excess of 75 KHz). would fulfill a long felt need in the autonomous vehicle industry. Although the transportation industry is only recently focused on autonomous modes of operation, the military has long been studying these and related problems. This new invention utilizes and combines known and new technologies in a unique and novel configuration to overcome the aforementioned limitations of the extant technology.

BRIEF SUMMARY

In accordance with various embodiments, an operational guidance or vision system for a autonomous vehicle is provided. It will have low power consumption, a large field of regard and a very high sampling rate; much faster than liquid crystal systems. More importantly, it will be comprised of a series of integrated panels structurally affixed 360 degrees about the vehicle. In the preferred embodiment, this vision system will be a LIDAR receiver that is integrated into most or all of the vehicle's windows.

Various modifications and additions can be made to the embodiments discussed without departing from the scope of the invention. For example, while the embodiments described above refer to integration of the LIDAR receiver into the glass surfaces of the vehicle, the scope of this invention also includes embodiments integrated into panels affixed to the exterior surface of the vehicle or embodiments having different combinations of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components.

FIG. 8(*b*) is a conceptual representation of the reflective mode of the transmit module;

FIG. 9(*b*) is a conceptual representation of the reflective receive mode of the receive module;

FIG. 12(*b*) is a simplified conceptual representation of beam path alteration occurring in a receive module;

DETAILED DESCRIPTION OF CERTAIN EMBODIMENTS

Figure 1:
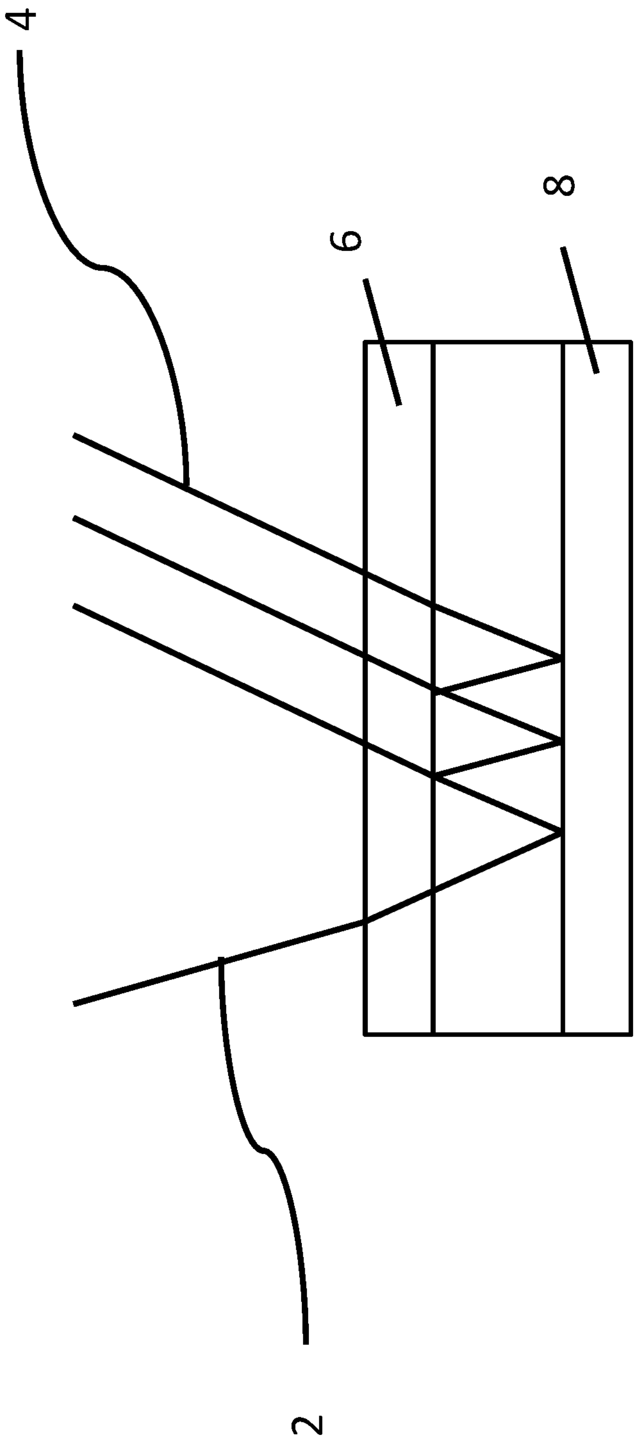
Figure 1 (Prior Art)
FIG. 1 is a conceptual representation of prior art reflect mode modulation beam steering.

While various aspects and features of certain embodiments have been summarized above, the following detailed description illustrates at least on exemplary embodiment in further detail to enable one skilled in the art to practice such an embodiment. The described example is provided for illustrative purposes and is not intended to limit the scope of the invention.

In the following description, for the purposes of explanation, numerous specific details are set forth in order to provide a thorough understanding of the described embodiment/s. It will be apparent to one skilled in the art, however, that other embodiments of the present invention may be practiced without some of these specific details. Certain structures and devices may be shown in block diagram form. While various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Unless otherwise indicated, all numbers herein used to express quantities, dimensions, and so forth, should be understood as being modified in all instances by the term "about." In this application, the use of the singular includes the plural unless specifically stated otherwise and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Unless otherwise indicated, all numbers herein used to express quantities, dimensions, and so forth, should be understood as being modified in all instances by the term "about." In this application, the use of the singular includes the plural unless specifically stated otherwise and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The term "modules" as used herein comprise beam scanners, optional optical components, detector or emitters and may or may not encompass the individual controllers and/or operational guidance system, depending upon the particular embodiment under consideration. The use of terms and inclusion of specific components in the drawings are not intended to limit the scope of this invention in any way.

The term "series of particles", "particles", "system(s) of particles" or as used herein refers to a grouping of elements including molecules, molecular clusters, ions, agglomerated particles, nano clusters, individual nano particles, quantum dots, clusters of quantum dots and carbon nano tubes, whether having an induced or permanent dipole moment, or not, that can be electrically addressed for use in creating either a sequential or a random-access pointing system. In all cases the materials in question are applied in a planar fashion in the preferred embodiment but can also be deployed in other orientations relative to the substrate or to one another. The particles can be applied alone or in concert with other materials designed to restrict their movement. The applications may be layered or otherwise As used herein the term "vision system" refers to components of a fully automated (ADA) or semi-automated (ADAS) operational guidance system for vehicles. The vision system uses electromagnetic signals to collect detection and ranging data for objects or the lack thereof, in the vicinity of the vehicle. Signals thus collected are passed to the downstream analytical components of the automated operational guidance system for the steering, acceleration and braking of the vehicle. The vision system means, comprises and encompasses the "transmit" module and/or the "receive" module of the present invention. In either case, or the case where the two units are deployed together as an integrated system, both units are tied to the scanning of a beam, the steering of a beam to a random point or the interrogation of a given random point within a given field of view. Thus, the system is capable of random access pointing or sequential pointing, which is another important distinction between this and other technologies.

As used herein the terms “transmit” and “receive” mean emitting or absorbing all or a portion of any electromagnetic signal by equipment used for detection and ranging applications.

As used herein, the terms “transmissive” and “reflective” as a modifier to beam steering refer to the pathway of the electromagnetic beam relative to the beam scanner. Transmissive beam steering is characterized by an electromagnetic beam pathway through the beam scanner on its way to subsequent downstream components. Reflective beam steering refers to a pathway where the electromagnetic beam is reflected from at least one substrate plate of the beam scanner to subsequent downstream components. The transmissive and reflective beam steering may be used with receive beam scanners used in a receive mode as at least one part of a receive module or may be used with transmit beam scanners used in a transmit mode as at least one part of a transmit module.

As used herein the terms “transmit modules” and “transmit modes” are used for transmissive beam steering and the terms “receive modules” and “receive modes” are used for reflective beam steering, all of the foregoing terms are interchangeably used in singular and plural without conveying any different intent, application or meaning.

As used herein the terms “lens” and “collecting optic” refer to any element(s) interacting with electromagnetic signals as they pass to or from the emitter or detector components, functioning as any one or all of the following, alone or in concert: refractive, diffractive or reflective element(s).

As used herein the term “arbitrary size” refers to a grouping of all possible sizes as used with respect to “particles” present in the devices described herein. The sizes in the grouping comprise any range, but the optimal results occur when the particle sizes are distributed over a narrow size range (i.e. dispersion) typically less than 200 nm and can be as small as 0.5%.

As used herein the term “partially conductive substrate plate” refers to a grouping of all possible substrate materials that are by nature or can be rendered conductive to electrical, thermal, magnetic or optical signals for use in affecting the local electronic/electro-optical environment within, on, or next to the substrate plate used in beam scanning/beam steering applications.

As used herein, the term “signal” refers to both the plural and singular form of the word. i.e. signal and signals, and refers to any electromagnetic wave or particle generated within, on, in, in the vicinity of, or near the operational guidance system, the vehicle, the beam scanner, the electronics supporting any of the same and all necessary support components, including, but not limited to, its sub systems or components.

As used herein, the term “beamlets” are defined as any signal that has been steered by a beam scanner and been converted in part or in whole from a received beam to a steered beam.

As used herein, the term “field of view” means any grouping of points that can be illuminated by the emitted beam of the guidance system. The points of the grouping can be either consecutively (sequentially) or randomly addressed or interrogated.

A used herein the term “substantially transparent” means capable of passing more than 5% of the incident radiation.

As used herein the term “partially conductive” means capable of transmitting or receiving a signal through, from, around, about or over a metallic, dielectric or semiconducting material, which could comprise any of a number of materials, including, but not limited to, glass, polymers, gels, ceramics, organic molecules, carbon in any form, crystalline or amorphous materials or mixtures, layers or stacks thereof.

As used herein the term “induced dipole moment” refers to any number of charges that can be placed into, on, through or near any “particle(s)” resulting in a user controllable change in the polarizability of the particle, the local environment or the dielectric substrate after the receipt of an external signal containing the charge or triggering its release.

As used herein the term “permanent dipole moment” refers to a dipole or charge that persists without any external control input.

As used herein, the term “dipole” refers to any electrical point or area charge localized on, in or near a particle in the beam scanning or beam steering device.

As used here the term “beam scanning”, “beam steering/scanning” and/or “beam steering” refers, interchangeably, to any modification, by reflection, diffraction, refraction, or any change in the incoming or outgoing electromagnetic signal, that results in a change in the direction of propagation of the wave or particle comprising the electromagnetic signal, particularly when the degree and direction of the change can be generated, determined or predetermined via the application of any external control signal.

As used herein, the term “communicating” refers to moving a signal along the chain of component parts without regard to the precise nature of the conveyance, for example in an optical context, “communicating said collected electromagnetic signal pulse to or into said receiver”, simply means delivering the signal into an optical conveying device to ensure its arrival into the detection mechanism. (the optical conveying device includes, but is not limited to, lenses, fibers, refractive or diffractive optical elements, GRIN optics, freeform optics, or the functional equivalent alone or in concert with other optical conveying devices.

As used herein, the term “collected” refers to the absorption or direction of any portion of an electromagnetic signal(s) for the purpose of relaying said signal(s) to a detection apparatus or subsystem, which could be a semiconducting element, a diode or any other detection scheme or component commonly employed.

As used herein, the term “processing” or “signal processing” refers to any algorithmic treatment applied to data generated by and/or collected by the operational guidance system, including computational image analysis, rate, distance and vector information comparisons. The term also means any treatment, mathematical or otherwise, applied to any data stream associated with the guidance system.

As used herein, the term “operational guidance system” and/or “guidance system” and/or “navigation/navigational system” means the set of components required for the autonomous or semi-autonomous control and operation of a vehicle, (generally a computerized control system for pilotless operation of a vehicle), which might or might not be autonomous, but rather equipped with some augmented sensing capability. This set comprising optics, lenses, beam scanners, beam steering modules, emitters and detectors, alone or in concert with signal processing units and driver circuits; also referring to the same deployed in a vehicle either as an integrated system from a manufacturer or as a stand-alone system for modifying vehicle operation from an after-market point of view. Stated otherwise, it is a combination of a vision system and an operational guidance system to enable the autonomous or semi-autonomous operation of a vehicle.

As used herein, the term "random access steering" refers to the ability of a beam scanning/steering system/subsystem/ component to receive or emit electromagnetic signals not coincidentally located in space from any two non-consecutive spatial cone angles. Especially in vision systems, the ability to move in an other than ordered and linear fashion, similar to CRT displays where the electron beam was scanned line by line, in order from top to bottom without interruption. In the present invention the capability exists to randomly address any part of the environment, thus offering a higher resolution "look" at any area by user or computer control. In effect, this innovation creates the ability to generate a point cloud of arbitrary density.

As used herein, the term "beam steering elements" refers to any of the various components arranged in order to emit and disseminate (transmit) and collect and steer (receive) electromagnetic waves or particles into or from the environment external to the vehicle to facilitate collection of vision system data for eventual generation of a control signal related to operational control of a vehicle, vehicle subsystem or component.

As used herein, the term "optical conveying device" refers to any optical element, including, but not limited to fibers, lenses, lenslets, arrays, waveguides, of field effects devices used to communicate an electromagnetic signal from one component to another.

As used herein, the term "drive signal" refers to the set of inputs to any vehicle system or sub-system. This drive signal can be generated by a guidance system in response to data generated by or collected by components of the vision system.

As used herein, the term "controller", "external control signal" and "control signal" refer to the signals responsible for determining the pointing direction of any element of the beam steering/scanning apparatus or the entire beam steering/scanning apparatus.

As used herein, the term "moving parts" refers to any component(s) that changes physical position or orientation.

As used herein, the terms "MIXSEL", "VCSEL", "VECSEL" each refer to specific types of semiconductor lasers also collectively referred to as optically pumped semiconductor lasers or semiconductor disk lasers. More generally the term laser, fiber laser, or diode laser as used herein comprise the set of all lasers regardless of lasing medium capable of generating a single electromagnetic pulse, or a train of electromagnetic pulses, emitted at a frequency.

As used herein, the term "vehicle" refers to any device including but not limited to cars, trucks, boats, motorbikes, light rail, trains, buses, trams, streetcars, RVs, watercraft, aircraft, lighter than aircraft, spacecraft, and military equipment.

The present invention relates to a novel design for a vision system for a vehicle, specifically for an autonomous or semi-autonomous vehicle, completely different from anything done before because it removes limitations imposed by the approaches previously undertaken. In the way of further understanding the prior art, the following provides additional background into the prior art, pointing out its shortcomings and where the prior art rigidly stuck to its dogma.

Figure 3:
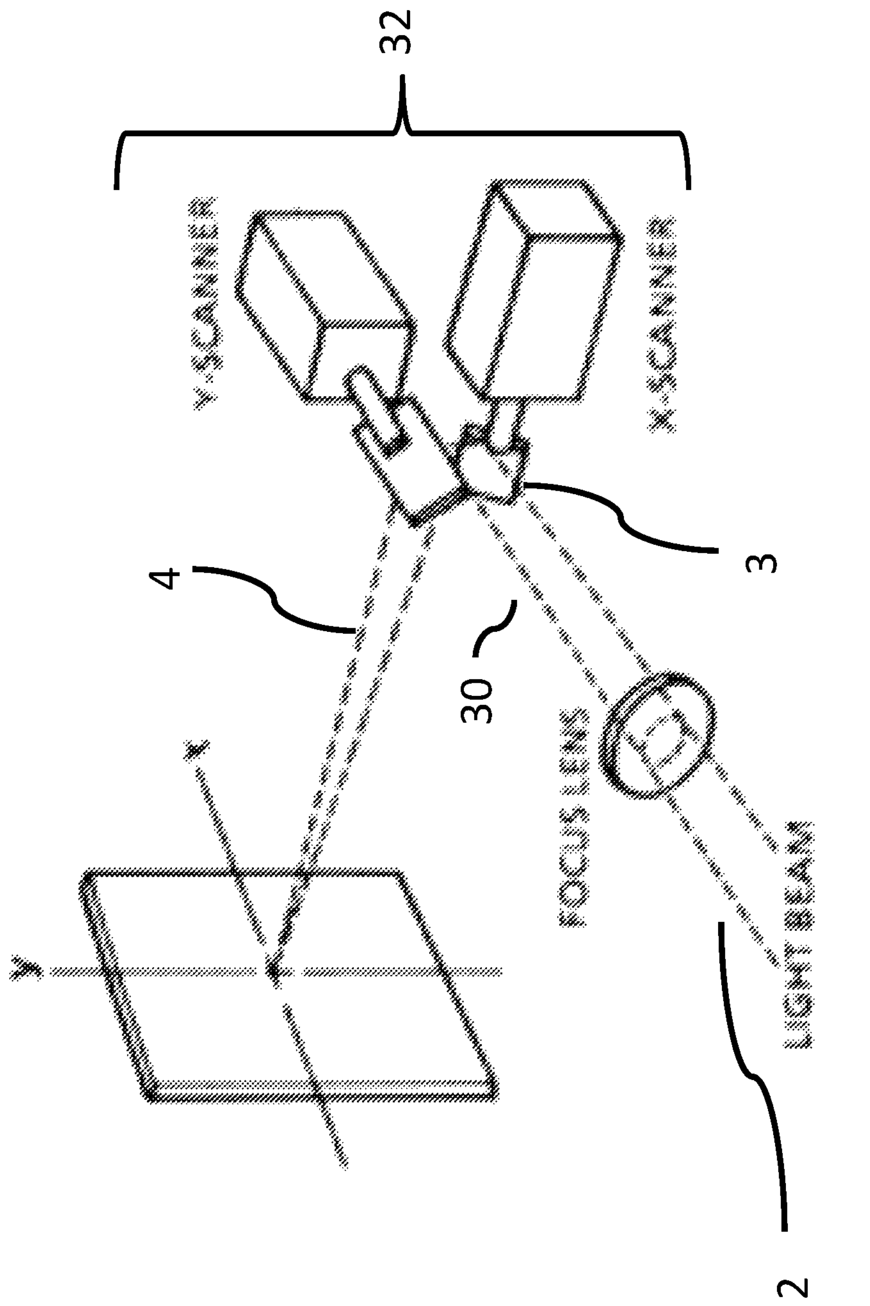
Figure 3 (Prior Art)
FIG. 3 is a conceptual representation of prior art Galvo scanning unit.

Light beam steering or scanning is important for use in all current vision systems for autonomous vehicles. All of these applications use mechanical beam steering devices to steer incoming electromagnetic beams either through movable deflection, MEMS devices or rotating mirrors (galvanometer and polygon systems) as suggested in the light beam steering system 32 of FIG. 3. Here in FIG. 3 it can be seen that incoming light beam 2 is focused through a lens to become the focused light beam 30 which impinges upon moveable mirrors 3 to become the steered light beam 4 which impinges on the desired target.

The challenge for non-mechanical beam steering is that, for many applications, one desires to steer the beam through a large angle (45° or more) and to have reasonably large apertures (five cm or more IFOV). This implies a very large number of steering states (defined in one dimension as the total steering angle divided by the diffraction-limited angular spot size). This implies the ideal solution for high speed, high angle, non-mechanical beam steering will have many steering devices to provide those steering states or a dispersion of discrete elements across the optical field that can be individually and multiply addressed through an electrical signal to provide the required states, but also with a large aperture and a very fast refresh rate in order to accommodate frequencies greater than 100 kHz.

Related to the number of steering states is the Lagrange invariant. This invariant is a property of the optical system and does not change with propagation through the system, including components like telescopes, and other lenses. At a pupil plane (in air), the Lagrange invariant is defined as the product of the radius of the pupil times the tangent of the maximum steering half-angle. Hence, for the specifications above, Lagrange invariants on the order of 2.5 cm or larger are of interest. To achieve this value, non-mechanical steering with at least two stages or ranges is needed: a large-angle discrete steering stage and a small-angle continuous steering stage as suggested in U.S. Pat. No. 5,093,740.

The physics of non-mechanical beam steering can be understood by considering the effect of a prism on an incident beam normal to a surface. The index of refraction in a prism is larger than that of air, so light travels more slowly within the prism. The angle of light passing through a prism will be changed because the light moving through the thick portion of the prism will be delayed compared to light traveling through the thin portion. Steering can be accomplished by changing the thickness of the prism. Light could be steered electronically by writing a prism. The problem is that it is difficult to create an optical path difference (OPD) as large as would be required to write a full prism of appreciable width. For example, a 10-cm-wide aperture steering to 30° would require >5 cm OPD on the thick side of the prism.

For example, phased array microwave radars steer to angles larger than 45°. To do this, the radars use individual radiators that are at a half-wavelength spacing or closer. Overcoming such a limitation would provide a novel approach to the design of a new vision system for autonomous vehicles of every type.

In radar, the conventional discussion of half-wavelength spacing says individual phase adjustable radiators must be no larger than half-wavelength to reduce grating lobes after J. Frank, et al., *Radar Handbook* Merrill Skolnik, 3e, McGraw-Hill, pp. 13.2-13.3, (2008). This is a different view of the same physics about which the present innovation is concerned.

LIMITATIONS OF THE PRIOR ART

FIGS. 1 to 7 illustrate aspects of the prior art which make the prior art alone or in combination, unusable for the construction of a vision system for autonomous vehicles. The prior art failures are twofold: they teach a scan frequency that is too low and the field of regard (IFOV) is too small. For these reasons, the data provided to operational guidance system from the vision system is too sparse for safe operation. The more significant and relevant prior art solutions are chronologically described briefly below.

There are many challenges to creating a reliable, economical and robust solution to beam steering and a number of interesting solutions have been proposed; of those that have been proposed to solve the problems associated with mechanical scanning systems, none have truly demonstrated broad-based applicability to the scanning market and certainly fewer have been adopted in commercial systems. Beam steering using rotating mirrors is by far the most widely adopted solution, L. Bieser, et al, *Handbook of Optics*, vol. 2, Ch. 19, (1994). Unfortunately, rotating scanning mirrors are not suitable for compact optical systems and are inherently prone to acceleration sensitivity, limiting their application to substantially stationary, highly vibration isolated systems or systems with extremely high scan rate requirements, greater than 75-100 kHz, depending upon the payload. Although many advances have been made over the last 35 years, currently available devices can only offer binary beam steering or those that are limited in speed and/or clear aperture. Additionally, all of these systems suffer from significant power requirements to operate, further limiting their applicability.

Rather than move a mirror, which requires acceleration and deceleration time, the ideal solution is to simply steer a light beam without use of a mechanical element. Direct light control can be achieved through any number of means, but each scheme imparts limitations to its broad application due to cost or performance. Light can be thus controlled utilizing waveguides. For instance, U.S. Pat. No. 5,347,377, entitled "Planar Waveguide Liquid Crystal Variable Retarder" relates generally to providing an improved phase delay device designed to change wavefront directions by applying alternating currents signals between 2 and 50 volts rms. The disclosure teaches changing phase delay for only TM polarized light. These limitations are overcome in U.S. Pat. No. 9,366,938 B1, which teaches the use of a liquid crystal (LC) enhanced waveguide modulation achieved through use of direct current signals applied to a conductive substrate. This device makes use of LCs that have by far the largest electro-optic response of any known materials, $10^5$ times larger than that of lithium niobate, for instance, in this new configuration. Rather than transmit the light through the LC material, usually less than 20 um thick, the LC material acts as a cladding for a waveguide material.

The evanescent field of the guided light wave extends into the adjustable-index LC cladding. This rather clever adaptation selectively employs the well-ordered LC-surface region that provides low scattering losses (less than 0.5 dB/cm) and fast response times (10-500 μS), while avoiding any interaction that is coupled to LC thickness, which avoids limitations imposed by short LC interaction length and slow relaxation times. In spite of all of this, this solution is only optimized for transmission applications, with the proviso that the input beam diameter is quite small and well ordered. This device architecture is limited to narrow beam diameter and therefore suffers from large divergence in low signal/noise environments, to say nothing of applications in so-called single photon detection applications. This limits the applications of this invention to transmitting applications where beam scanning is desirable.

For some time, Bieser et al, SPIE Milestone Series, vol. 378 (1985), have made a large effort to overcome the limitations of mechanical, acousto-optic and LC based beam deflectors using solid electro-optic (EO) crystals. These are characterized as having a refractive index (RI) that changes in response to an applied electric field. The change with E field can be linear (Pockels Effect) or quadratic (Kerr Effect). There are a number of different schemes that have been proposed. Many of these are based upon the principle of linear variation in index causing the wavefront of coherent radiation thus incident to be bent in the direction of increasing index. Presently, devices constructed to render this effect are either slow due to mechanical components and limitations, limited in aperture with small angles of regard or limited in scanning speed due to relaxation characteristics, i.e. LC materials, which while very versatile, are effectively useless at scan rated approaching 100 kHz.

U.S. Pat. No. 3,357,771 to Buher et al. discloses a beam deflector comprising an elongated bulk crystal of linear electro-optic effect potassium dihydrogen phosphate encased on two opposite elongated sides between hyperbolically shaped dielectric blocks, which are in turn coated with conductors such that, when an AC voltage is applied to the conductors, a linear electric field variation occurs in the crystal causing the desired linear variation RI. Most bulk crystal solutions require significant voltage to drive desired deflections, say 150V for a 2.34°, making them impractical for portable or electric vehicle applications, even if the aperture could be arbitrarily large, which is not the case.

Another approach by Watanabe, et al. covered in U.S. Pat. No. 4,343,536 uses dual arrays of interdigiated electrodes on one surface of an elongated crystal. AC voltages thus applied, particularly in the MHz range, produce an effect, while not exactly linear, that induces a nevertheless controllable deflection of a light beam. The device patent works with a large number of materials and is incorporated herein by references for such teachings. The aforementioned device and many others like it, which utilize elongated media, suffer from polarization sensitivity, making them wholly unsuitable for reflected light applications.

For large beam diameters, U.S. Pat. No. 3,787,111 discloses a device comprising a layer of strontium barium niobate on a transparent substrate. A closely-spaced array of linear stripe electrodes is deposited thereon. Independent voltage signals are then used to locally change the RI under each electrode, creating in the perpendicular direction to the electrodes an approximately linear change in RI. A light beam whose diameter is large compared to the electrode spacing will be deflected as it travels through the medium, will be deflected in a direction also perpendicular to the electrodes. In order to be most successful, this approach requires electrode spacing, which is small compared to the wavelength of the light. U.S. Pat. No. 5,093,747 provides further insight into devices of this construction. If the electrode spacing is not small, diffraction effects occur creating lobes off the main beam. This effect was used to some advantage in U.S. Pat. No. 4,639,091, by Huignard et al.

In addition to light transmitted through a layered device, (such as that described in U.S. Pat. No. 6,317,251), where the light is reflected after transiting the programmable layers, purely reflective deflection is possible in two dimensions. (FIG. 1 is a conceptual representation of a prior art reflect mode modulation beam steering, typically employed in telecommunications applications where the optical modulation is affected by a variety of materials, but the aperture for transmitting and receiving signals is less than 10 cm. An incoming beam 2 is reflectively steered through a variety of angles to create the steered beam 4 by interactions between layers of materials 6 and 8 with refractive index change proportional to applied signal. The incoming electromagnetic beam 2 can be repeatedly reflected and steered to generated steered beam 4 through a variety of electrically conductive transparent materials 6 with large index changes at the interfaces 8 with nearly equivalent performance. The requirements for reflective device operation are necessarily limiting in that the desired effect can only be applied in high signal to noise environments and makes receiving of low intensity, long distance return pulses (>150 m beam path) nearly impossible, to say nothing of highly limited field of regard or IFOV.

More recently electro optical materials have been extended into the polymer space, where a layered structure of support materials and a polymer matrix is utilized to effect beam steering. W. Wang, et al., report in *Sens Actuators A Phys*. pp. 1570-73, (2011) improvements have been made in reducing the applied voltage required to gain the desired EO response. Many EO polymers have been modified via additives and indeed structured to enhance their respective EO response by virtue of creating easily polarizable moieties on long-chain backbones, the innovation in Wang et al., relates to the use of a thermoplastic material and multi-stage prisms fabricated therefrom to achieve 29° deflection angle, which is notable for devices of this construction. This is limited in scaling and linearity of signal response across the field of regard.

Yaacobi, et al., conveys an innovative advance in phased array wide-angle beam steering as noted in *Optics Letters*, vol. 39, no. 15 (2014), where a high-speed, low power and wide-scan-angle optical phased array is reported. The array is based on a novel phase shifting architecture. The approach utilizes 32 μm long grating-based antennas, fed through evanescent field waveguide couplers from a bus waveguide with directly integrated thermo-optic phase shifters. The demonstrated phased array is continuously steerable over a 51° angular range with a 10.6V signal. The average power dissipated in such a device is ~18 mW/antenna with a 3.2 dB cutoff speed of 100 kHz.

Several notable advances of the state of the art at the time of publication are worth noting. Chief among them are the wide steering angle and very low power for such a deflection. The ability to operate at 100 kHz demonstrates on/off behavior that is much faster than LC materials and this device was also fabricated utilizing standard 300 mm silicon integrated circuit techniques are all significant advances. Here, the use of a spectral comb enables multi-beam emission, thereby enabling 2-D scanning in a design that can be modified for any wavelength from 1.2-3.5 μm. The device can be economically mass-produced for use in automobile accident avoidance technology, but questionably. Although the device from Yaacobi, et al. is a suitable advance in beam scanning, in order to operate in a commercially viable way in the AV space, the solution must address the receiving problem. Their device fails just as the Vescent Technologies, Inc. device of FIG. 6 has—it cannot admit beams of arbitrary size and thus both suffer from large divergence, which accelerates as the signal to noise ratios decreases.

Figure 6:
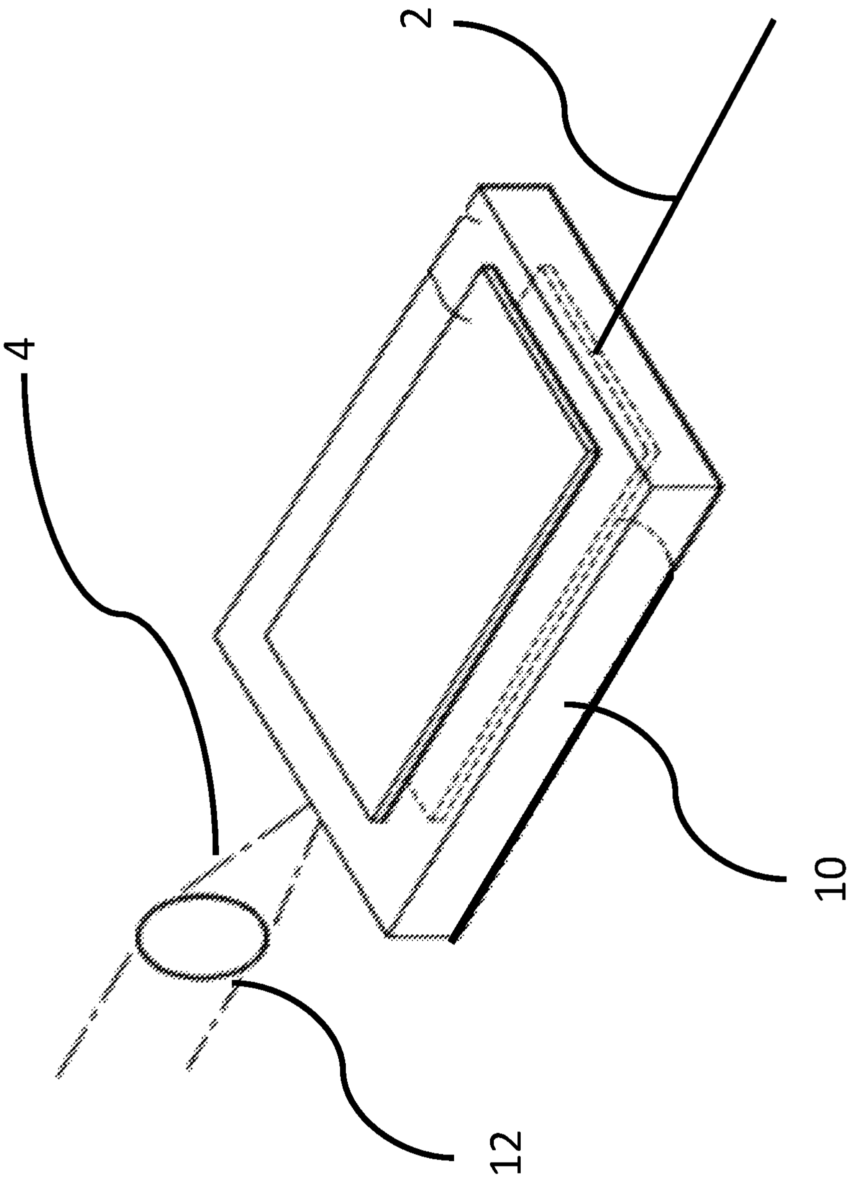
Figure 6 (Prior Art)
FIG. 6 is a conceptual representation of a prior art monolithic semiconductor beam steering device.

FIG. 6 illustrates the evanescent field device architecture using a so-called evanescent field having low scan speed, small aperture and narrow field of regard.

Incoming electromagnetic beams 2 are steered by control signals entering the device 10 and generating a cone of potential signal angles 12 which can be directed to fill an aperture of a downstream optic, of limited size. Unusable for transmitting or receiving at high frequency and an even smaller aperture than current galvo technology. Incoming beam 2 is manipulated by a surface electric filed applied to the monolith 10 to results in a steered beam 4 across a cone angle 12.

Figure 7:
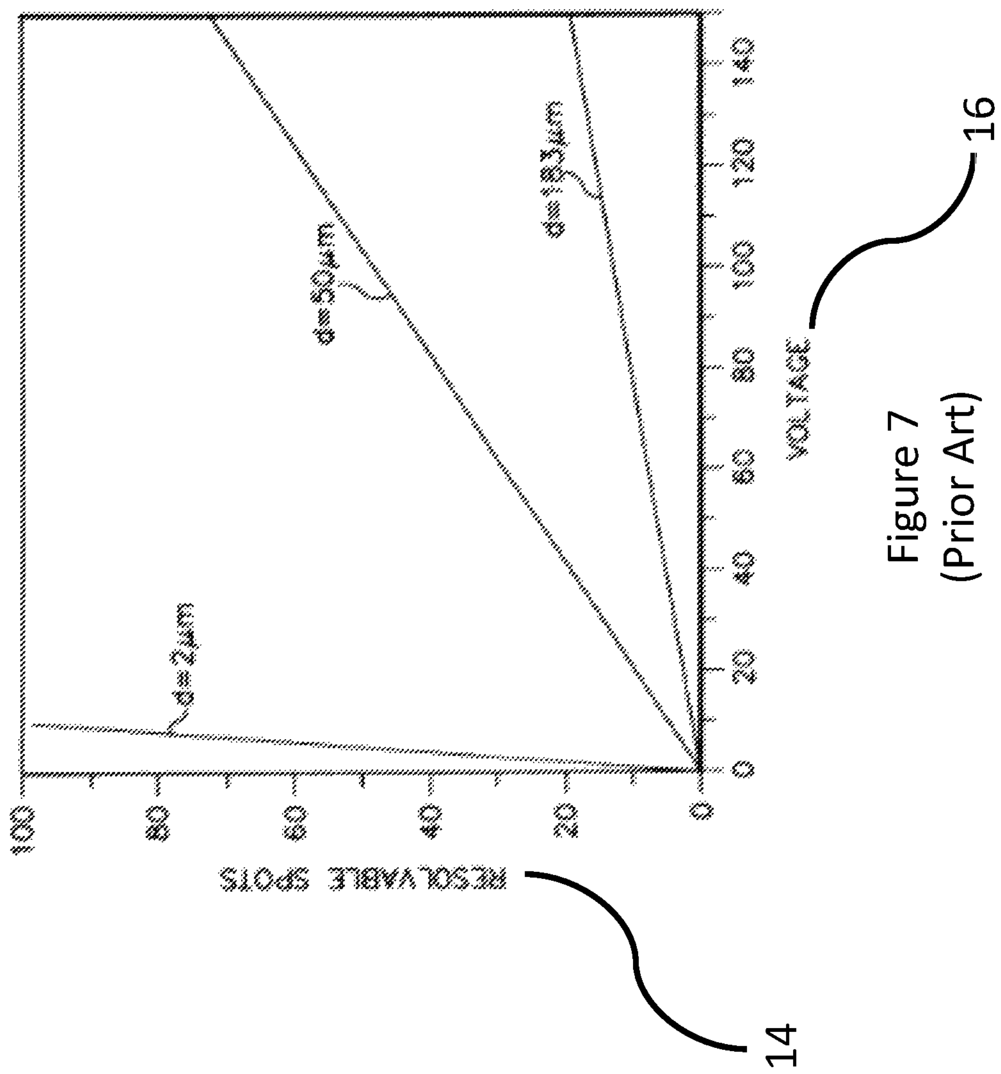
Figure 7 (Prior Art)
FIG. 7 a graphical representation of resolution as a function of applied voltage 16 showing the resolvable number of spots 14 at several spot diameters.

Furthermore, there are limitations in device scaling as suggested in FIG. 7, a graph of resolvable spots 14 vs voltage 16, and the active signal collection angle over which the device can be employed. The IFOV is too narrow for effective AV applications and is limited to applications where this is less problematic or the beams are highly directional.

To wit, the presence of side lobes also indicates a narrowed steering angle since there is no benefit in steering beyond the spacing of two consecutive beams. It has been variously defined, notably in Yaacobi et al., that the beam spacing, Δø, is the angle between the fundamental and the next order lobes. This angle can be derived by applying the first-order constructive-interference condition on the array's antennas with all of the antennas emitting at the same phase and it is related to the antenna pitch, d by the relationship $$\sin(\Delta\phi) = \frac{\lambda}{d} \tag{1}$$

where λ is the laser wavelength. Thus, increasing the angle between two consecutive lobes requires narrowing the antenna spacing. Unfortunately, since the antenna spacing needs to approach a half wavelength to achieve the full 180° steering range, approaching this range prevents the inclusion of other components in the interstitials between the antennas (such as phase shifters as in J. Sun, et al. *Nature* vol. 493, p. 195 (2013) and/or of waveguides to different antennas as in K. Acoleyen, et al., *Opt. Express* vol. 18, p. 13655 (2010).

Given that silicon photonics is inherently two-dimensional, extracting other components from between the antennas limits the array to one dimensional electrical steering and forces long optical antennas to cover the necessary aperture size. In the longitudinal direction, i.e. along the antenna waveguides, the emission angle of the $N^{th}$ order $\theta_N$, in air, is given by $$\sin(\theta_N) = n_{eff} - \frac{N\lambda}{\Lambda} \tag{2}$$

where $n_{eff}$ is the wavelength effective index and Λ is the grating period. This limits the broad applicability of that innovation and points to a need for an innovation where the electrical input components are not subject to such limitations and half λ spacing of the drive electrodes is possible.

Figure 5:
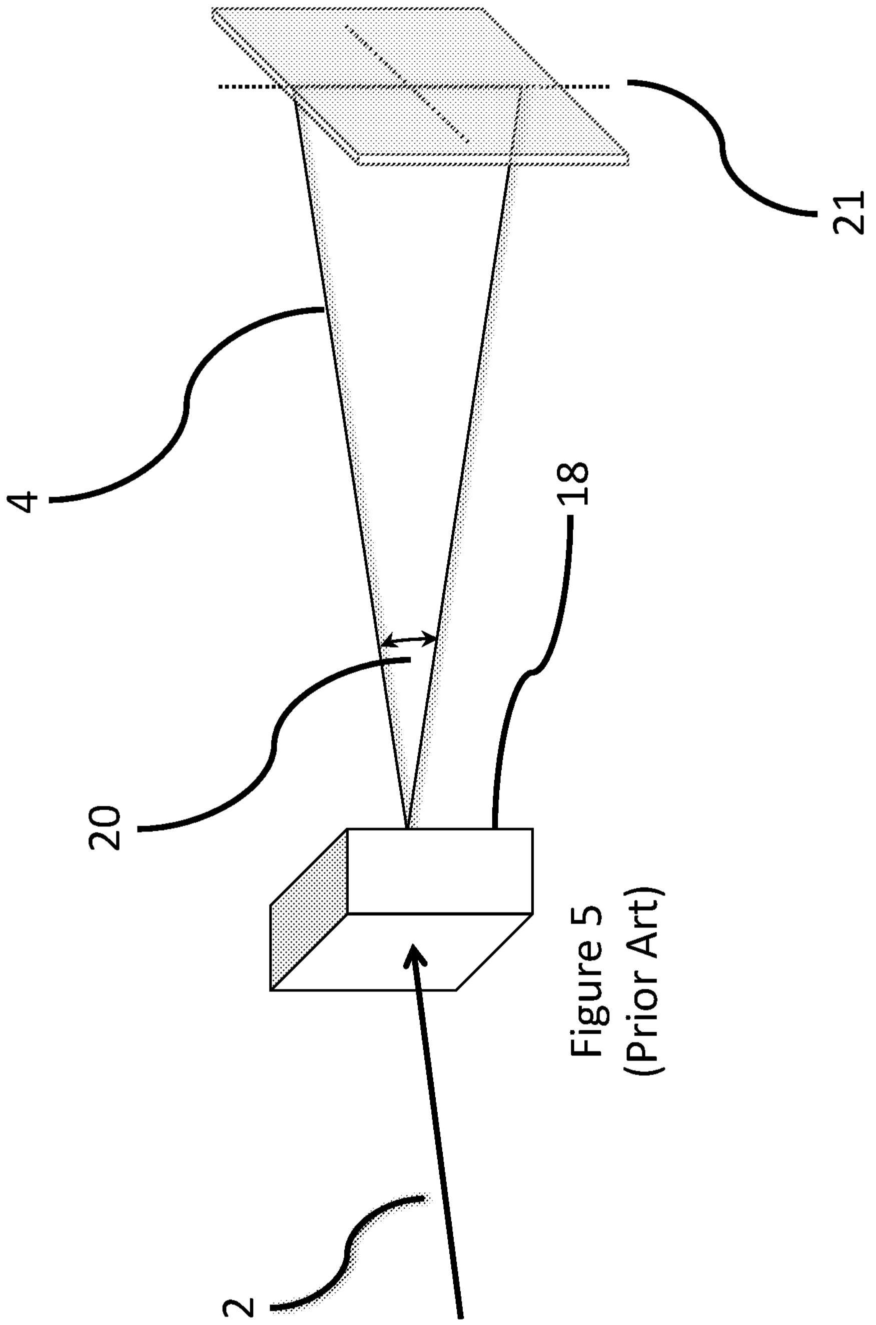
Figure 5 (Prior Art)
FIG. 5 is a conceptual representation of an AOM/AOD apparatus.

Electro-optical deflection or Acousto-optic deflection or modulation (EOD, AOD and AOM), as seen in FIG. 5, enable an incoming electromagnetic beam 2 to pass through the device 18 while the medium is stimulated to affect a change in index which moves the beam. Oscillating the incoming signal enables the beam 2 to be a steered beam 4 in a single axis 21 resulting in a narrow cone angle 20. Since the effect is quite small, large beam paths are required to create a usable effect. Here Electro-optical Deflection or Acousto-Optic Deflection or Modulation is accomplished by a device with a limited size aperture and field of regard, and a very small steering angle, requiring long beam paths to affect any useful beam steering from a LIDAR perspective. Incoming beam 2 is converted to a steered beam 4 by application of RF signals across the crystalline medium 18. The degree of deflection 20 determined by the frequency of the applied signal with the deflection occurring in only a single axis 21.

Figure 4:
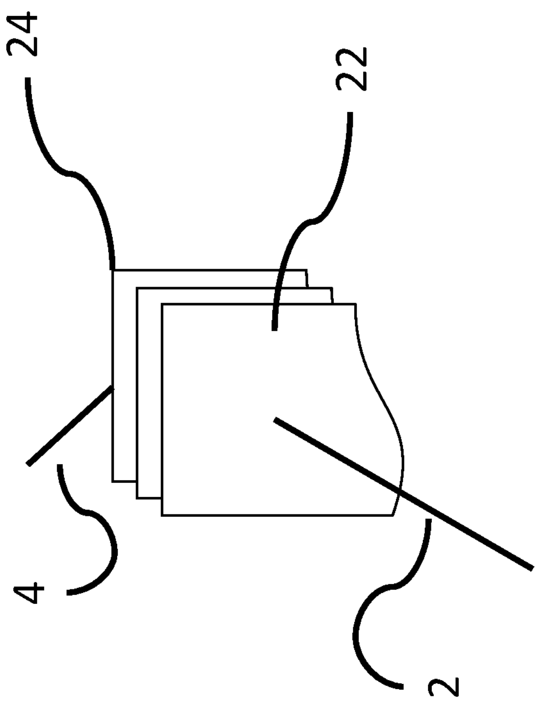
Figure 4 (Prior Art)
FIG. 4 is a conceptual representation of prior art transmissive multi-layer beam steering waveguide.

Several multilayer devices based on LC architecture have been created, as can be seen in the multi-layer liquid crystal spatial light modulator of FIG. 4. Here it is shown that an incoming electromagnetic beam 2 passes through a first layer 22, subsequent layers and finally the last layer 24 to emerge as steered beam 4 in a different orientation from which it entered, but the effect is limited in degree of deflection and is limited in its application to the reception of signals. Here the incoming beam 2 becomes the steered beam 4 by interaction with various layers of material 22 and 24 with variable electro optical responsiveness;

Broadly reviewing the field of non-mechanical beam steering, there are a number of categories into which the previous devices can be grouped, but typically these approaches did not lead to the desired large Lagrange invariant. Arrays of waveguides have also been investigated, e.g., in AlGaAs as described in F. Vasey, et al., *Appl. Optics*, vol. 32, pp. 3220-3332 (1994), but again waveguide arrays have a limited Lagrange invariant. Liquid crystal technologies are of particular interest because of the potential to achieve the large Lagrange invariants and at the same time can potentially be fabricated using well-established techniques for manufacturing liquid crystal displays, see A. Tanone, et al., *Microw. Opt. Technol. Lett.*, vol. 7, pp. 285-90 (1994). Liquid crystals approaches have been investigated for a considerable number of years since A. Fray, et al., in U.S. Pat. No. 4,066,334 completed his pioneering work in the field in 1978. Liquid crystals have high birefringence, so can steer by creating a large OPD for one polarization using relatively modest voltages. Liquid crystal devices have been fabricated to implement both variable blaze and variable period steering. The variable period approach used an array of piston phase shifters to approximate a saw tooth phase profile with 2r phase resets under electronic control. Steering time is typically on the order of milliseconds. While liquid crystal devices have several advantages, one important disadvantage has proven to be their steering efficiency at large angles. A result of the low efficiency is that alternate techniques have been investigated for steering to large angles, some of which have been discussed herein in detail and other by reference have been incorporated into this disclosure. The final steering system in systems such as these often consists of a liquid crystal optical phased array for continuous steering over small angles combined with an alternate technique that provides steering to a discrete number of larger angles. The combination results in a system with continuous steering over large angular range, but one burdened with limited scan ability in/above the 100 kHz regime, a necessary condition for broad application of non-mechanical beam steering in AV vision systems.

Of particular interest to the discussion of the present invention, is a device disclosed in U.S. Patent Application 2005/0225828 wherein a semiconductor material is imbued with quantum dots in order to effect electro-optic beam steering, which exhibits a larger Lagrange invariant, but is limited in application by steerable beam size, shows a limited span of control over the signal to be modulated and lacks the flexibility to be deployed in large phased array configurations required by LIDAR applications and the like. Additionally, the present invention alleviates the expense limitations associated with constructions of this sort by avoiding complex and time-consuming material deposition techniques such as MOCVD, CVD or epitaxy.

Most of these limitations are imposed on the device by virtue of its modulation schema requiring the signal to be confined within a waveguide in an era when the desired approach is a free space beam steering optic of innovative construction. Herein there exists a very important distinction between the prior art and the present invention: The present invention is concerned with beam steering over an extremely large range with virtually unlimited clear aperture, not with modulation of confined signals, per se and the ability to operate in either transmit or receive mode in a LIDAR system.

Taking stock of the state of the art, it is instructive to investigate as many related inventions and techniques to examine the various schema used for manipulating the E-M field associated with light. The present invention compares to previous methods, but improves the state of the art in its ability to function as both a transmit and receive unit by virtue of large clear aperture and transmission mode operation at or above 100 kHz, and ideally into the MHz regime to provide multiple pulses in flight at any one time to improve the point cloud density for optimum signal:noise ratio. Many other inventors practice art that is based upon reflection mode modulation, which while it will suffice for transmission mode operation, fails primarily due to polarization loss and efficiency where near single photon detection must be reliably achieved. Both U.S. Pat. Nos. 6,647,158 and 6,836,35 teach the modulation of light in waveguides by use of electro optical effects. Both suffer from limitations in capacitance and thus drive signal frequency. An improvement to this would embody drive frequencies >100 kHz in deployments related to LIDAR for transportation and navigation in AV systems.

The state of the art covers a wide array of intended applications, but few applications are specific to LIDAR systems for transportation. For all the incremental advancements, there are still a number of gaps in the current and prior art relative to the high-performance requirements outlined herein. Nearly all of the prior art is restricted to applications where a high intensity beam is required over a narrow aperture. For transportation applications, it is very obvious that the eye safety limit for fluence/average power, will be rapidly exceeded under these conditions. The ideal solution would require pulse energy of less than 2 micro Joules (<2 μJ). The prior art is further limited to small beam diameter or small aperture. Solving these limitations to enable a beam-scanning receiver without moving parts would revolutionize the autonomous vehicle industry.

Figure 2:
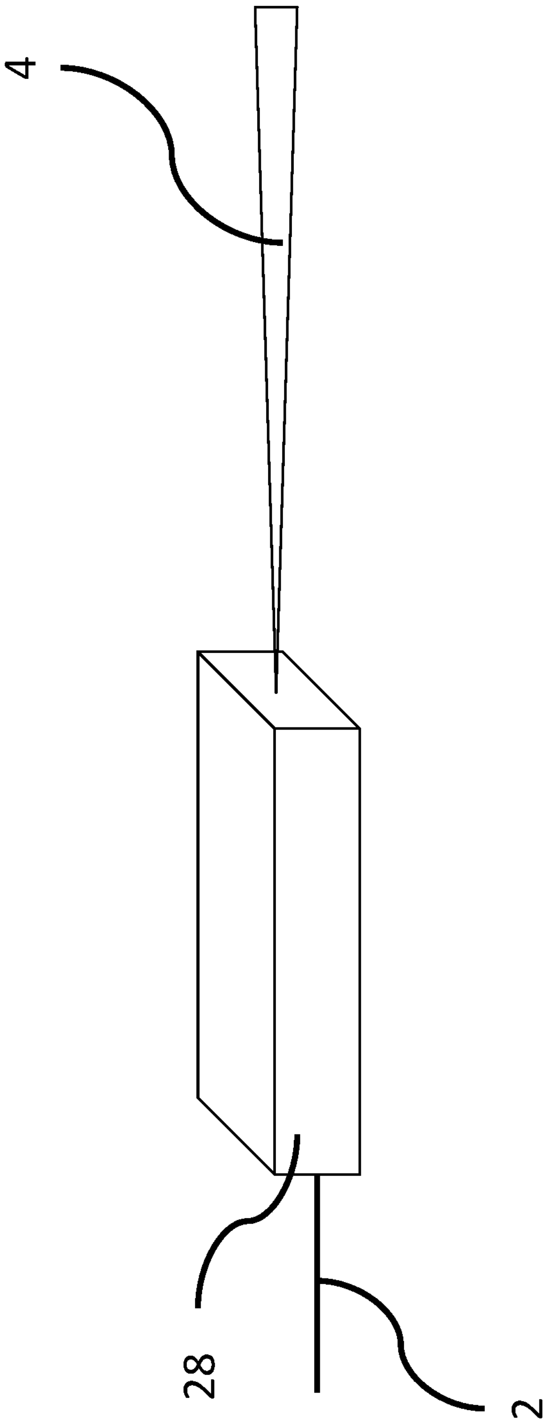
Figure 2 (Prior Art)
FIG. 2 is a conceptual representation of prior art transmissive optical modulator.

FIG. 2 illustrates beam steering available in a wide array of waveguide and telecommunications applications. Incoming electromagnetic beam 2 enters the waveguide 28 and emerges as the steered beam 4 (via the steering block, made of a variety of electro optical materials) guided to a variety of optical components coupled into the wave guiding medium. It has a low input aperture, slow scan speeds and ultimately no mechanism to usefully gather signals from the surrounding environs.

Additional and more current attempts to address these shortcomings exist in the prior art of Rohani (20190025430) and Uyeno (20170365970). These each teach systems for the autonomous operation of a vehicle, including solid state scanning mechanisms. Rohani uses a solid-state scanning mechanism with an optical phased array to steer pulses of light by shifting the phase of the laser pulse as it is projected through the array. Uyeno teaches a solid-state scanning mechanism using a liquid crystal waveguide. Neither Rohani or Uyeno allows for a wide IFOV because of their beam steering approaches.

Similarly, Capasso (20070058686) and Depree (20120212375) teach solid state scanning devices impactable for use in an autonomous vehicle control system.

Having discussed the downfalls of the prior art and their counter indications for limited success as an element of a vision system for an autonomous vehicle, the novel vision system and beam scanner will now be discussed.

The Beam Scanner

The present invention relates to a beam scanner for use in an operational guidance system having both a very large aperture (preferably up to 30 cm but as large as 1 m) and a very high scan speed, all without moving parts. This solves limitations presently inherent in current LIDAR/RADAR vision systems for autonomous vehicle operational guidance systems (LAVNS or RAVNS).

The increase in aperture is realized through the construction of a substantially transparent substrate plate (sheet) of arbitrary size and subjecting the device to perturbation of the substrate's electro-magnetic properties while at the same time exposing the substrate to the desired wavefront (transmitting or receiving). The device does not rely solely on electro optical effects, crystal axis, waveguiding or any of a number of approaches presently employed for a variety of modulation schemes in telecommunications.

All of the optical scanners presently contemplated or manufactured suffer from limitations in the size of the signal angle admitted by the device, which renders them unusable for LAVNS systems that approximate the manner in which typical gasoline powered vehicles operate, in the particular case of operational guidance systems deployed into electric vehicle applications. There are two primary limitations of present solutions for sampling or scanning in LAVNS applications. One of the primary limitations is scanning rate and this limits the maximum speed achievable by autonomous vehicles (AVs). The other is the size of the optical elements collecting or disseminating the signals. The present invention overcomes both limitations as well as providing a means to overcome signal/noise ratio issues associated with realizing a maximum cone angle to provide the largest IFOV (instantaneous field of view) possible.

A variably polarizable, substantially transparent, optical element is embodied in the present invention to effect beam steering for use in vehicle systems. By altering the internal electrical environment of the particles on the beam scanner plate, the path of a light beam may be altered. The invention comprises supporting substrates between which at least one layer of a matrix containing particles capable of variably creating a dipole moment under stimulation are distributed. The size of the particles should ideally be smaller than 500 μm (but could be much larger and indeed of any size) and can be derived from metallic, organic, insulating or semiconducting materials. The volume fraction of the particles should be >5%, but is variable for each type of material, an optimum being defined by the particular application envisioned for the device and could even be as high as 90% loading by weight.

Since the beam scanner may be utilized with existing LIDAR electromagnetic beam transmitters, the ideal operating wavelength is 1550 nm but the beam scanner can be constructed to operate in any wavelength range. The ideal scanning speed is about 1 MHz, but should be at least 100 kHz to be useful and could be as fast as 100 MHz.

According to an aspect of the present invention, the available clear aperture of the beam scanner is greater than about 5 mm and can be as large as 10 inches, while still having low divergence, about 2.5 milli-radians (mRad) providing for built-in isolation and signal discrimination. The range of the ideal operational guidance system's transmit/receive combination will exceed 200 meters and can be as large as 5 km.

The present invention's novelty lies in the design and operation of its beam scanner. This beam scanner (first beam scanner 47) can be used in a transmit module capable of random access, high frequency large aperture, rastering and random access pointing of (or reception of, from a wide array of angles) electromagnetic signals to cover a desired instantaneous field of view (IFOV). (FIGS. 8*a*, 8*b*, 9*a* and 9*b*) This beam scanner (second beam scanner 52) may also be used in a receive module. Either module may be operated in a transmissive mode (FIG. 8*a* and FIG. 9*a*) or a reflective mode (FIG. 8*b* and FIG. 9*b*) depending on whether the emitted is steered directly through the beam scanner or the emitted beam 39 is reflected off of the beam scanner. This is accomplished by altering the incident angle of the output beam onto the planar face of the beam scanner as can be seen comparing FIG. 8*a* to FIG. 8*b* and comparing FIG. 9*a* to FIG. 9*b*.

FIG. 8(*a*) is a conceptual representation of the transmissive mode of the transmit module 46, showing an electromagnetic beam emitter 45 (e.g. emitting a light beam from a laser or diode or dipole, etc.), an emitted electromagnetic beam 39, a first optical conveying device 43 and a first beam scanner 47 comprising at least one substantially transparent substrate plate functioning as a quantum dot phased array as discussed further herein, for creating random access pointing (steering) of an incoming signal (the electromagnetic emitted beam) 39 for the purpose of high-speed (MHz) illumination of the external environment 38 (external to the vehicle) by interrogation from the steered electromagnetic beam 50. The user selectable degree and direction of the steering is provided by input control signals from a controller 61 that is operationally connected to the operational guidance system 44, which is also operationally connected to the emitter 45. Note, that the controller 61 may or may not be integrated into the operational guidance system and could either be a separate stand-alone device or exist as an integrated subsystem within the operational guidance system electronics. This applies to all such constructions within this disclosure.

FIG. 8(*b*) is a conceptual representation of the reflective mode of the transmit module 46 showing conversion of the emitted electromagnetic beam 39 into a random-access user-directed steered beam 50 by reflection from the first beam scanner 47. Its properties are altered by the application of control signals as discussed above.

FIG. 9(*a*) is a conceptual representation of the transmissive mode of the receive module 36 where reflected electromagnetic beams 48 are collected at arbitrary angles after reflection from an external environment 38, containing objects/surfaces 40. The steered electromagnetic beam 60 is created by the second beam scanner 52 by application of control signals from the guidance system 44 and directed onto an optional second optical conveying device 56 to create a conveyed beam 62 that is conveyed on the detector 54 which is operationally connected to a guidance system 44.

FIG. 9(*b*) is a conceptual representation of the reflective mode of the receive module 36 where reflected electromagnetic beams 48 reflected from the environment external 38 are collected at arbitrary angles and communicated to the detector 54 through a beam steering effect generated by reflection from layers on the second beam scanner 52 supplied with control inputs from the guidance system 44.

Both the transmit module embodiments (in transmissive or reflective modes) and the receive module embodiments (in transmissive or reflective modes) are capable of spatially random-access or sequential emission/collection of the electromagnetic signals. It is to be noted that the complete operational guidance system may be comprised of either or both of these modules together, or the vision system may be comprised of the receive module in conjunction with a transmit module of a different (non-beam scanner) design. The heart of the present invention is the beam scanner (as structurally and functionally described herein), used as a receive beam scanner in the receive module of the operational guidance system.

Figure 8A:
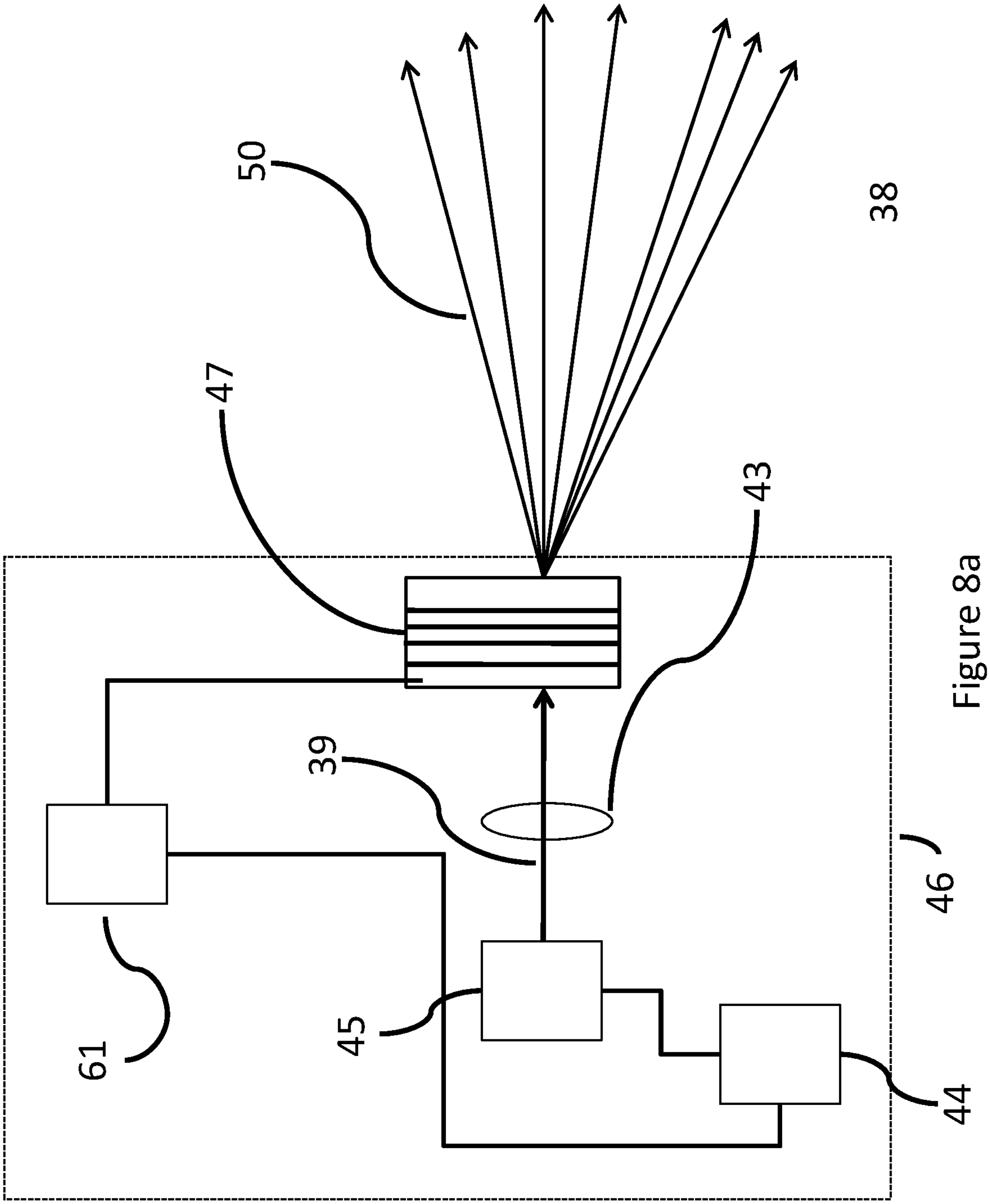
FIG. 8(*a*) is a conceptual representation of the transmissive mode of the transmit module.
Figure 8B:
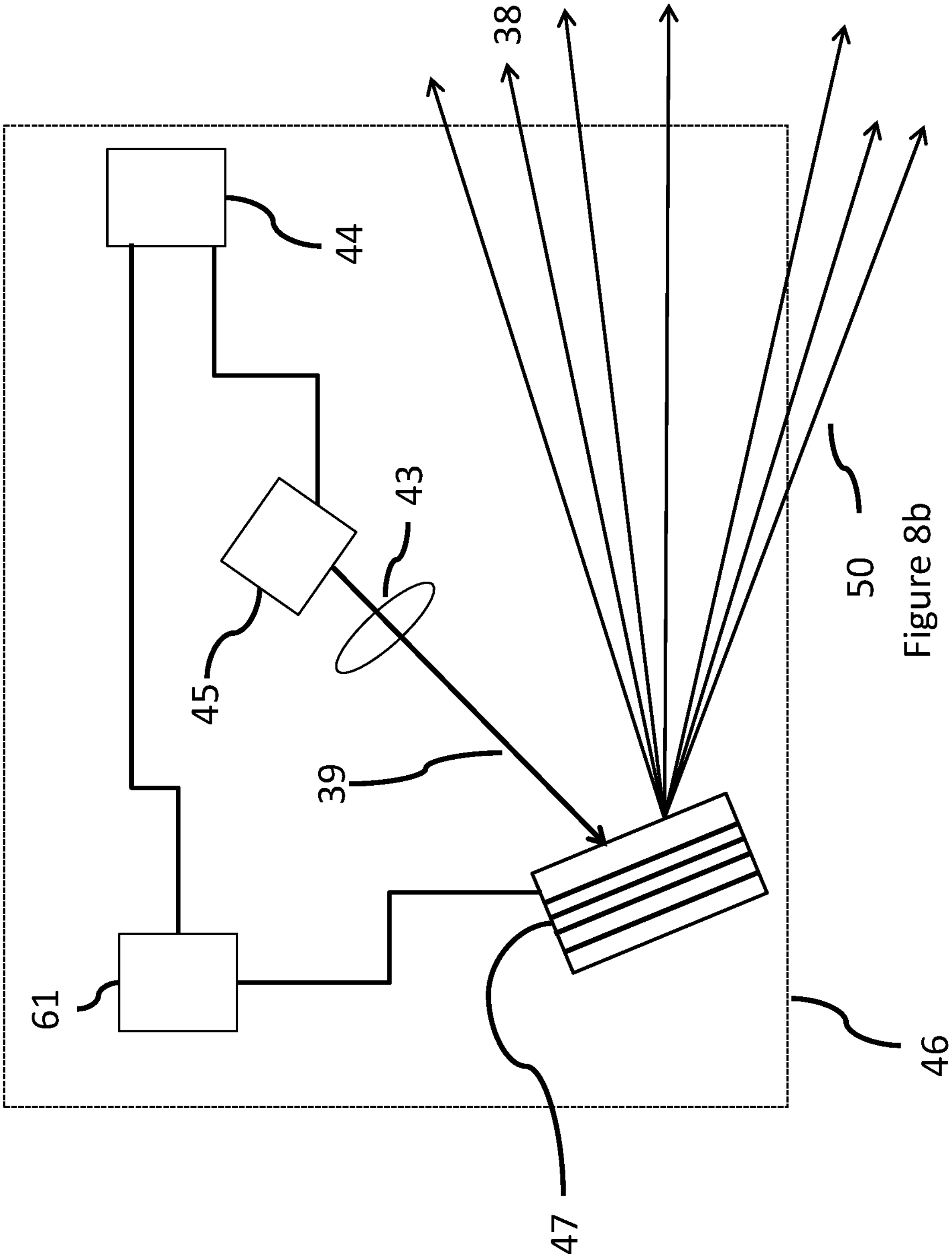
Figure 9A:
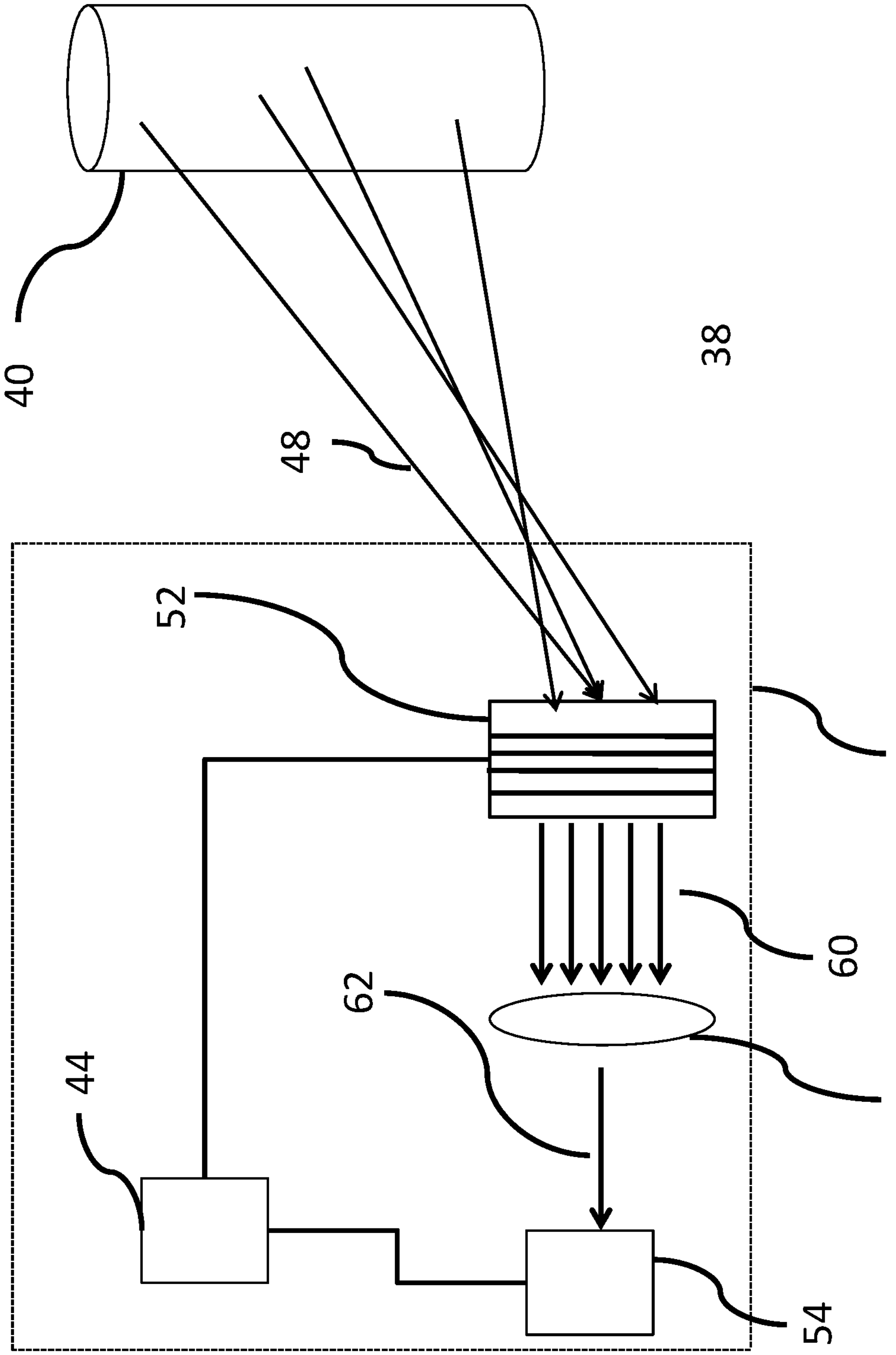
FIG. 9(*a*) is a conceptual representation of the transmissive receive mode of the receive module.
Figure 9B:
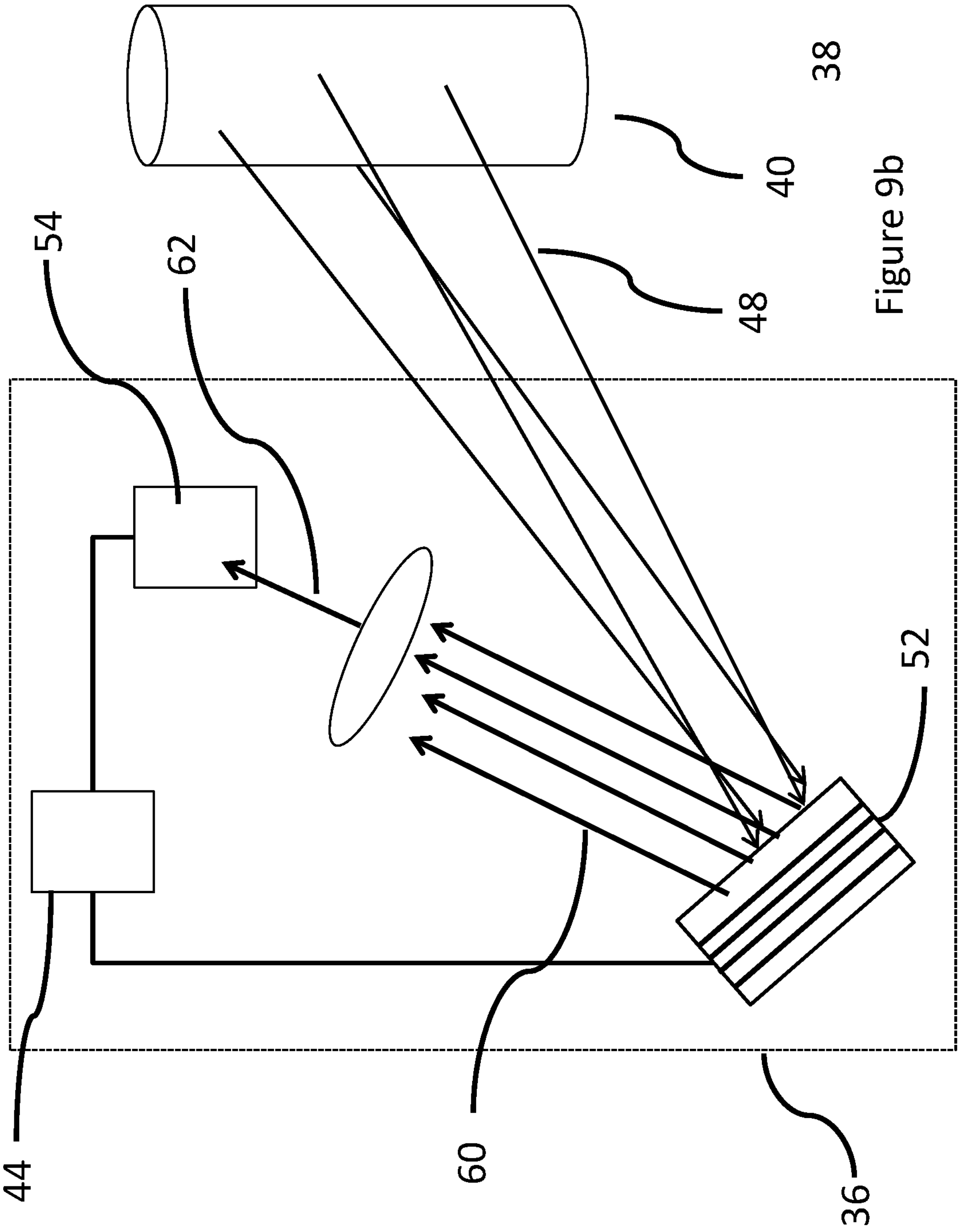

The quantum dot phased array LIDAR system 42 above further comprises at least one transmit module 46 (FIGS. 8*a* and 8*b*) that generates the electromagnetic signal pulse 39 to illuminate the environment external 38 to said autonomous vehicle 34. FIG. 8*a* shows a transmissive mode transmit module 46 while FIG. 8*b* shows a reflective mode transmit module 99. The difference between the transmissive mode transmit module 8*a* and the reflective mode transmissive module 8*b* is that the signal emitter passes directly through the beam scanner wherein the other reflects off of a face of the beam scanner. The signal emitter is made up of a controller 61 in operational contact with a solid-state emitter 45 that illuminates the environment external to the AV 38 using light from 800 nanometers to 2000 nm. The light may be produced from a variety of potential laser light sources, with the MIXSEL being ideal because of its pulse encoding capability. However, diodes, solid states lasers (DPSS, VECSEL or VCSEL lasers) or a fiber laser would also be suitable light sources as long as their pulse duration is 50 ns to 0.5 fs.

Figure 10:
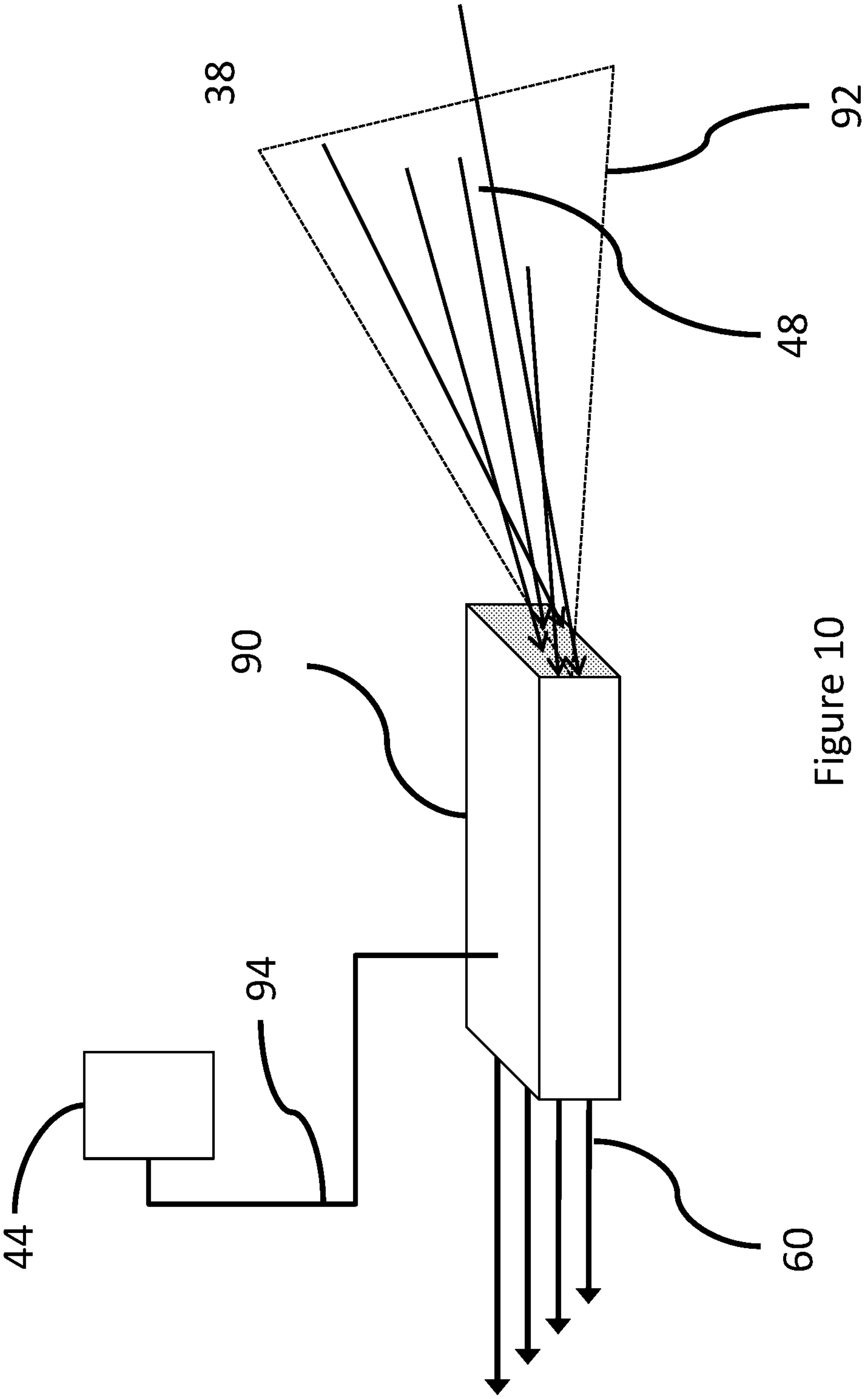
FIG. 10 is another conceptual representation of the beam scanner depicted as a transmissive mode receive module.

FIG. 10 is another conceptual representation of the beam scanner depicted as a transmissive mode receive module, comprising at least one transparent, partially conductive substrate plate 90 as described elsewhere herein with beam steering capability 1000 times better than any low entry angle devices with poor aperture, in both transmissive modules or receive modules, capable of scan speeds >75 KHz and up to 500 MHz. The transmit module and the receive module are in fact manifestations of the same phenomenon, which changes in the electro optical interaction with electromagnetic waves. It is achieved by application of control signals 78 or 80 to the substantially transparent and partially conductive substrate plate, the signals are varied to affect varying degrees of angular deflection which defines the cone angle 92 over which the beam scanner can collect reflected beams 48 from the environment external 38 to the module or scanner or vehicle, depending upon the embodiment. The control signals originate from the operational guidance system 44 directly or indirectly in the case where case where its controller is integrated or stand alone.

The beam scanner (used in the receive module, and/or the transmit module) in more technical terms is commonly known as a spatial light modulator that alters the direction of electromagnetic wavefronts incident on the substrate plate. This beam scanner's novelty lies in the fact that it uses no moving parts and is made of at least one substantially transparent and partially conductive substrate plate having at least one generally planar face with a series of affixed particles where each of the particles are of an arbitrary size, and where each of the particles possess an induced dipole moment, and where each of the particles are in electrical contact with the partially conductive substrate plate.

The substrate plate(s) of the beam scanner is/are in operational contact with a controller. The controller alters the electrical environment of the particles (preferably quantum dots) by changing their dipole moment proportionally with the degree of electromagnetic wavefront steering desired. This steering enables communication of the steered electromagnetic wavefronts from beam scanner to a detector. This steering is affected on a length scale proportional to the size of the affixed particles. This length scale corresponds to the size of the pixels or voxels contained on the substrate plate(s). The structural details and operation of the beam scanner in conjunction with the operational guidance system are more fully discussed herein. The terms electromagnetic wavefront, pixel and voxel are used with their commonly accepted technical meanings, especially when used in conjunction with LIDAR or any similar, adjunct or analogous technology.

Figure 11:
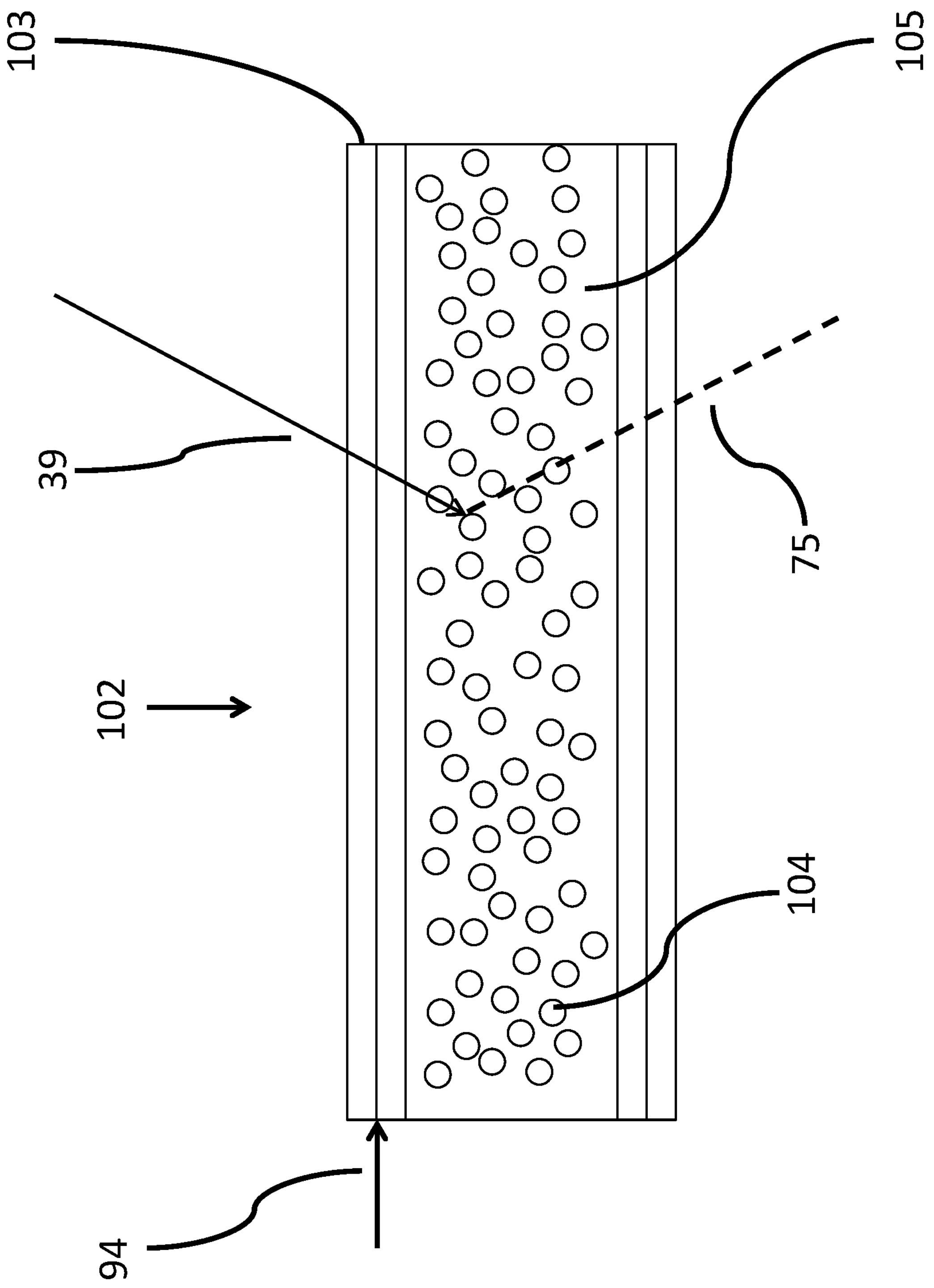
FIG. 11 is a conceptual illustration of the beam scanner with a control signal applied.

FIG. 11 is a conceptual illustration of the beam scanner with a control signal 94 applied to the beam scanner structure 102 (with 105 shown as an example layer magnified for clarity) to create a controllable beam path resulting in a steered beam 75 through the substrate plate stack 103, comprising at least one substrate plate with affixed particles 104 that provide point sources of induced dipole moment to generate both permanently polarized regions as well as variably polarized regions of material to adjust the angle through which the signal 39 travels. This can occur as transmissive mode beam steering or reflective mode beam steering in both transmit and receive modules.

Conceptually, the beam scanner resembles FIG. 10, where reflected signals 48 from arbitrary angles are collected by the stack of plates of the beam scanner 52 and directed as a steered beam 60 along a single direction through an optional optical element 56 onto the detector 54.

Figure 12A:
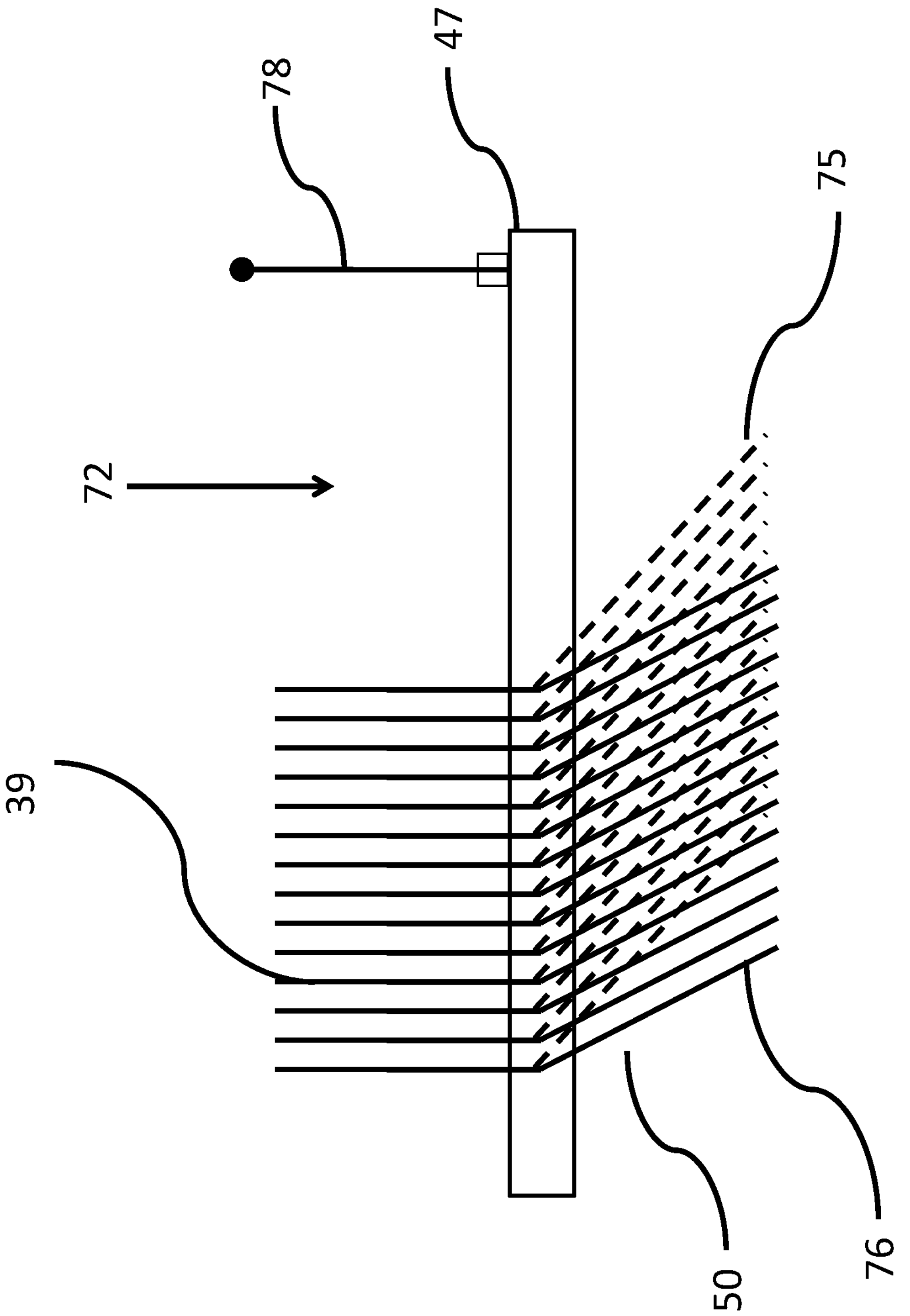
FIG. 12(*a*) is a simplified conceptual representation of beam path alteration occurring in a transmit module.
Figure 12B:
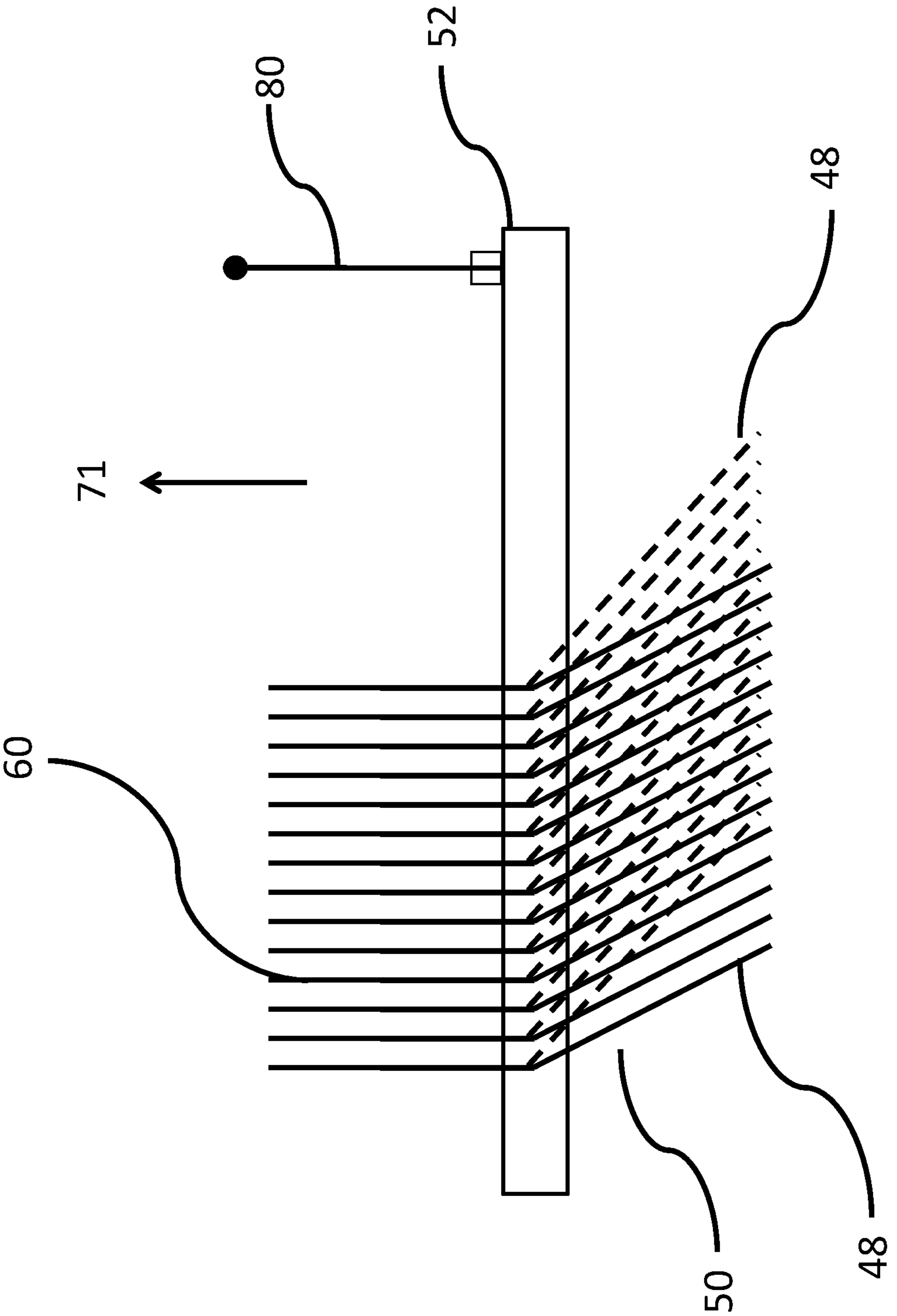

Looking for more clarity in terms of device operation, FIGS. 12A and 12B illustrate how the beam scanner can operate in both transmit and receive modes, which is to say that the electromagnetic signals may pass through the substrate plates of the beam scanner 47 or 52 in either direction.

FIG. 12A (transmit module) shows the outgoing (emitted) beams 39 generated by the emitter passing through the first beam scanner 47 which steers these interrogating beams 50, comprising laser pulses, through a wide range of randomly addressable angles, into beamlets 75 and 76, such that those beamlets cover the desired field of regard (IFOV) to interrogate the vehicle's external environment. The direction of signal propagation is illustrated by directional arrow 72. Those beamlets 75 and 76 are being steered through whatever angle the user desires by virtue of transmit control signals 78 supplied from the controller to the beam scanner 47. Basically, the beams progress from ordered and collimated to variably angled beams.

FIG. 12B (receive module) shows the incoming reflected beams 48 (shown originating from different angles) reflected by the environment external to the vehicle, passing through the second beam scanner 52 which steers the reflected beams, comprising reflected laser pulses, from a wide range of randomly addressable angles into the collimated beamlets 60, which are then communicated to the detector. The direction of signal propagation is illustrated by directional arrow 71. The randomly reflected incoming reflected beams 48, cover the desired field of regard interrogating the vehicle's external environment. Those beamlets 60 are being steered through whatever angle the user requires for collection by virtue of receive control signals 80 supplied to the second beam scanner 52. Here the beams go from variably angled to ordered and collimated beams.

Yet another aspect of the present invention comprises a control system for rastering the beam path across the entire device or within pre-defined regions or within "pixels", the size of which is defined only by the size of the control electrodes and the density of loading in the support matrix.

The pre-determined arrangement of the particles, quantum dots or molecular clusters with charge centers, for instance, would enable some control in the size and arrangement of the portions controllable by virtue of external inputs, effectively adjusting the granularity of the beam steering. In order to affect optimal coverage, ideally two devices would be included in the beam path and paired with cylindrical lenses behind each scanning matrix. The size and position of the lenses could be varied by application, but generally the beam scanning/steering device is positioned to deliver scanned/interrogated pixel/position information to a collecting optic of some ilk.

The beam scanner operates by creating localized dipole moments by virtue of an applied external field, which could be supplied by either direct current or alternating current at a sufficiently high duty cycle to affect beam steering at the desired scanning frequency as delivered by the external driver circuitry, minimally 2-5 kHz ideally up to 100 MHz. This enables a very interesting random pointing capability which opens the doors for a substantial increase in computational image analysis to further enhance the performance and safety of a vehicle thus equipped. This results in very high-density optical data without being overly cumbersome on terms of size. High frame rates without a linear increase in pixel rates, provides an optimal condition for enhanced point cloud density without the computational burden, regardless of the wavelength being employed, since the beam scanner can be optimized for any wavelength desired. The components of the device minimally scatter or substantially transmit the 1550 nm radiation, being substantially transparent, but could operate at any wavelength longer than about 800 nm. The particle size has some influence on the size of the applied signal, but the particles need not be particularly small to experience very high field strength over a very short length scale. Given sufficiently high intensity, the non-linear contribution of the index of refraction can be influenced, inducing a change in wavefront direction, by applied electrical magnetic or optical signals. Interestingly enough, the effect can be observed by application of magnetic, thermal and optical excitation to the device, with varying degrees of magnitude. Each signal has an optimum choice for identify, loading, dispersion and patterning of the particles in the device. All devices would ideally be solid state devices in the preferred embodiment of an operational guidance system.

In one embodiment, the absorption spectrum of the supporting matrix, which need only be transparent to the 1550 nm radiation, and could thus be fashioned from amorphous silicon (Si), plastic or glass, is necessarily altered by the presence of the electric field. The inclusion of polarizable entities, molecules or particles or clusters of particles, amplifies this effect, thereby offering a means of solving the limitations of beam scanners used in LIDAR systems for autonomous transportation (AT). Beam scanning accomplished by means of physically moving objects is limited by scan speed (mass) and aperture (size). Applying the present innovation to a beam scanner that can receive signals from an arbitrarily large range of angles leads to a solution to the problem of self-driving cars now being faced by every manufacturer presently testing them. Whether LIDAR or RADAR guidance systems, all suffer the limitations imposed by moving masses, i.e. galvanometer scanners or others of that ilk, which ultimately limit vehicle speed and point cloud density. Limits on laser power due to eye safety requirements, even at 1550 nm further reduce the total signal available for collecting the required point cloud density at the require frame rate.

Introduction of particles or polarizable molecules into a substantially transparent, partially conductive substrate plate, naturally alter the electronic behavior (dipole moment) of the host material, if not at least, its internal electronic environment. It is by controlling how these particles (quantum dots in the preferred embodiment) are supplied to the plate or applied to the surface of the plate that the present innovation creates a device with no moving parts and an arbitrarily large aperture, capable of controllably steering incident electromagnetic radiation into or out of an emitter or detector as the case may be. A dispersion of particles applied to a transparent partially conductive substrate plate will, under suitable stimulation, create a spatial light modulator that is an optically (also electric and/or magnetic) addressable beam steering device. Utilizing multiple layers of this construction, one can create an array capable of so-called 2Pi modulo wave front steering at very high efficiency, high switching frequency and utilizing a variety of variable frequencies to accomplish the desired operational modes of the device or system.

The particles ideally would be supplied by electrospray techniques that render the particles covalently bonded to the supporting medium and even one to another, but the effect can be demonstrated with simple spin-on techniques. The deposition technique renders the droplets containing the particles or molecules positively or negatively charged relative to the target substrates and this creates a means for creating charge separation by building many layers of thus modified substrate plates. This charge separation can be controlled by judicious choice of process conditions to create permanent alteration of the electronic environs in a material, which means that the light beams can be effectively steered even without application of external control signals. This can be further enhanced or perturbed by the optional use of an externally applied signal, if desired, for instance an electric, magnetic or optical field. Use of quantum dots as a particle species, is an example of an embodiment of this innovation where the field can be affected by using an electromagnetic beam of different wavelength in place of or in concert with the control signals to effectively steer the beam through individual pixels, zones of pixels or voxels.

In the preferred embodiment of the invention, the substrates thus treated with the electro-sprayed materials, now sufficiently imbued with centers of localized charge separation, are laminated together, forming a stack capable of deflecting the electromagnetic signal of interest through a pathway to bring the signal into or out of an aperture of an optical element mounted nearby, along an optical axis defined by the apparatus, such as a lens, and ideally a cylindrical lens-one for each axis of interest. Each desired axis of motion or axis of scanning for reflected signals, is served by such a device stack and a lens.

In the preferred embodiment, the device comprises a pair of lenses and a pair of substrate stacks to effectuate collection of reflected signals from the outside environment through which the AV is navigating or otherwise sensing, measuring or interrogating. Ideally the control signals will be cycled across the device such that each region of the device can "look" at a variety of angles over the entire substrate, in a random fashion, such that the entire external region illuminated by the source, located on the AV, would be interrogated for reflected signals. Given the speed of light, to "look" downrange 200 meters, there is a window of 1-2 nanoseconds in order to address or interrogate each point within the field of view.

The rate would ideally be set to match the required time of flight associated with a desired pulse rate from the illuminating (emitting) source, with the intention of putting and keeping multiple (at least two) pulses in flight at all times before any two sequentially emitted pulses could have one of the pair detected by the receive module. The higher the rate the more light pulses could be placed "in flight" which increases the resolution of the picture obtained by the LIDAR or vision system.

The key innovation in using the particle approach is in the switching speed or scanning rate, which is ideally >100 kHz; a regime presently served by no optical scanning device on the market-especially when one adds the additional restriction of needing an aperture as large as 2-5". In so doing, multiple pulses and the high scan speed deliver a very high-resolution picture of the environment. The key innovation is the ability to randomly address the beam for illumination and to randomly interrogate individual points for receiving in order to increase the frame rate without increasing the pixel rate. The resolution capability in sequentially scanned systems is inherently limited by the data handling capability of the system processing computer.

In the preferred embodiment for the AV application, the plates would be no more than five mm thick and ideally each element would require only three stacks, although as many as fifty can be envisioned for certain applications. The stacks would be roughly six inches on a side, to form a rectangular or elliptical window through which the incident light would travel en route to the detector. A preferred embodiment is indicated in FIG. 13.

Figure 13:
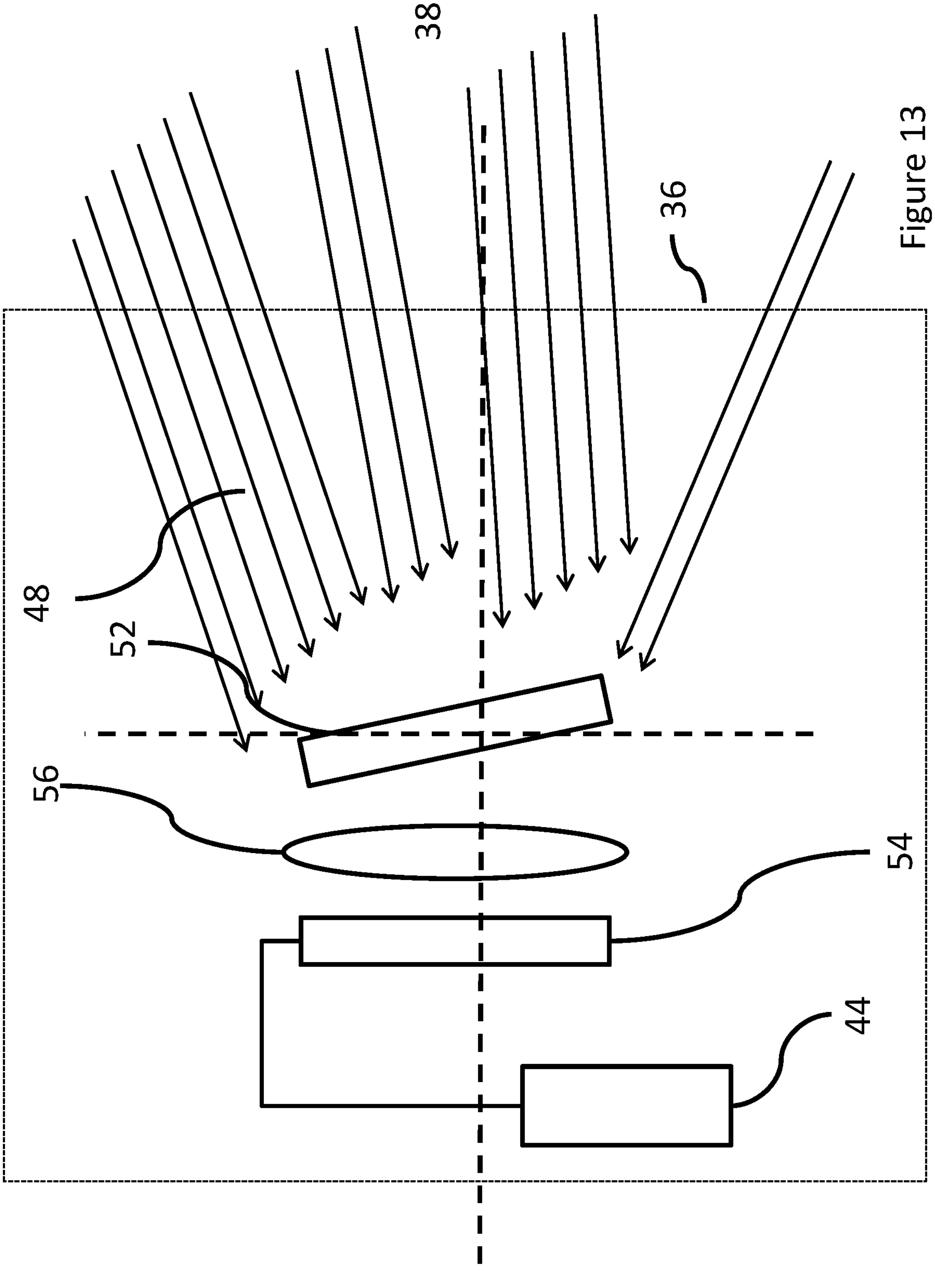
FIG. 13 is a conceptual representation of the receive module.

FIG. 13 is a conceptual representation of the receive module 36 which includes second beam scanner 52, optional optical conveying element 56, detector 54 and guidance system 44 (which is a microprocessor) as the navigation system inputs without specifying a separate block component controller. The guidance system may interchangeably either directly control or process inputs from a stand-alone controller.

Figure 14:
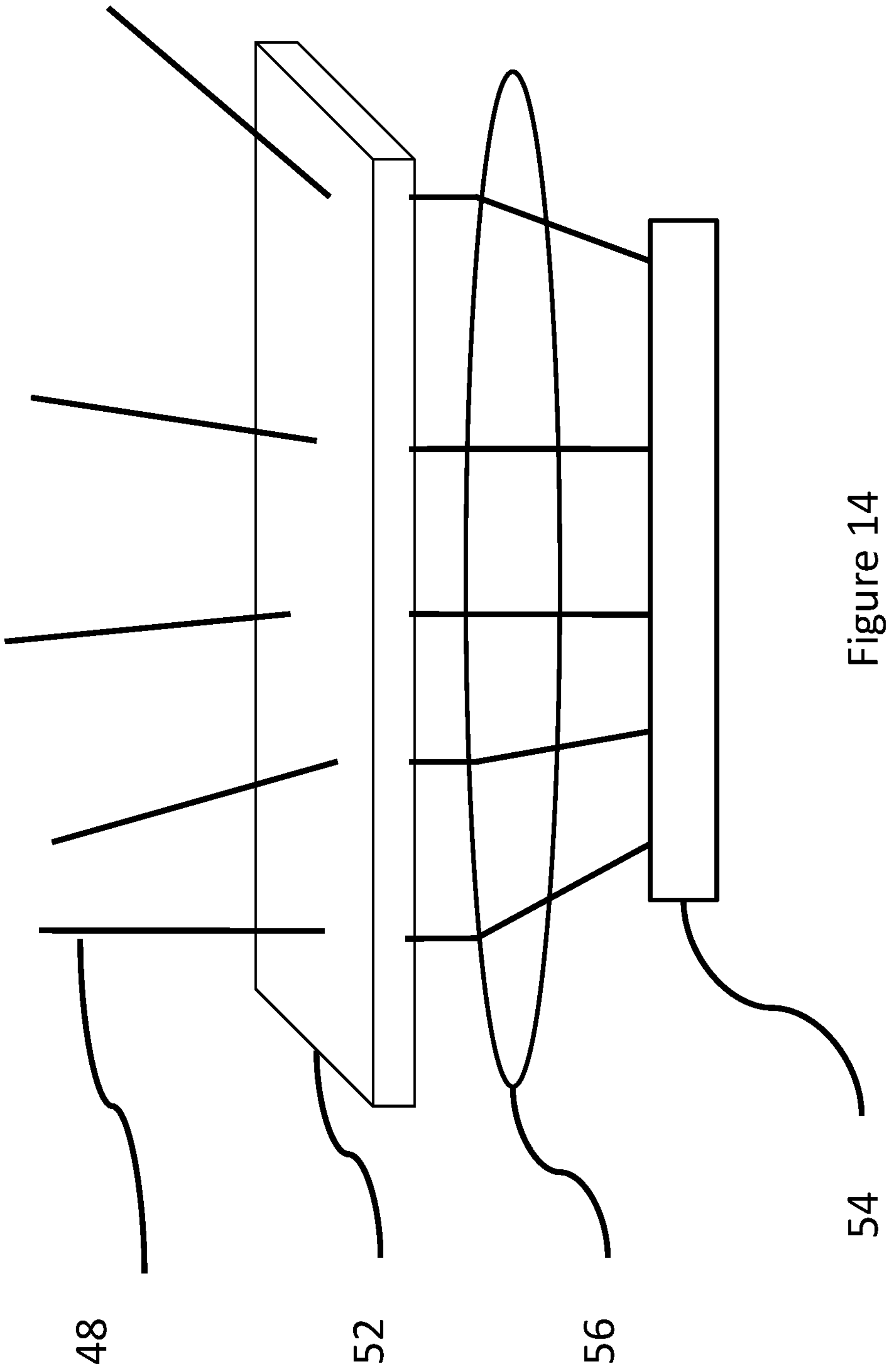
FIG. 14 is a conceptual close-up detail of receive module sub-systems from FIG. 13.

FIG. 14 is a conceptual close-up detail of the receive module sub-systems of FIG. 13. Here the second beam scanner 52 and optional optical conveying device 56 focusing variably reflected electromagnetic interrogating beams 48 onto the detector 54. The detail illustrates the arrival location of the interrogating beams 48 and the steering effect placing the beamlets into the aperture of the optional optical conveying device or the detector. The second beam scanner 52 is a substantially transparent and partially conductive substrate plate having at least one generally planar face with a series of particles affixed with said plate (FIG. 11). Each of the particles 104 in the series of particles, are of an arbitrary size, and each of the particles 104 possess an induced dipole moment. Each of the particles are also in electrical contact with the partially conductive substrate plate 103. The detector 54 generates an output signal that it communicates to the guidance system 44 of the vehicle.

Figure 15:
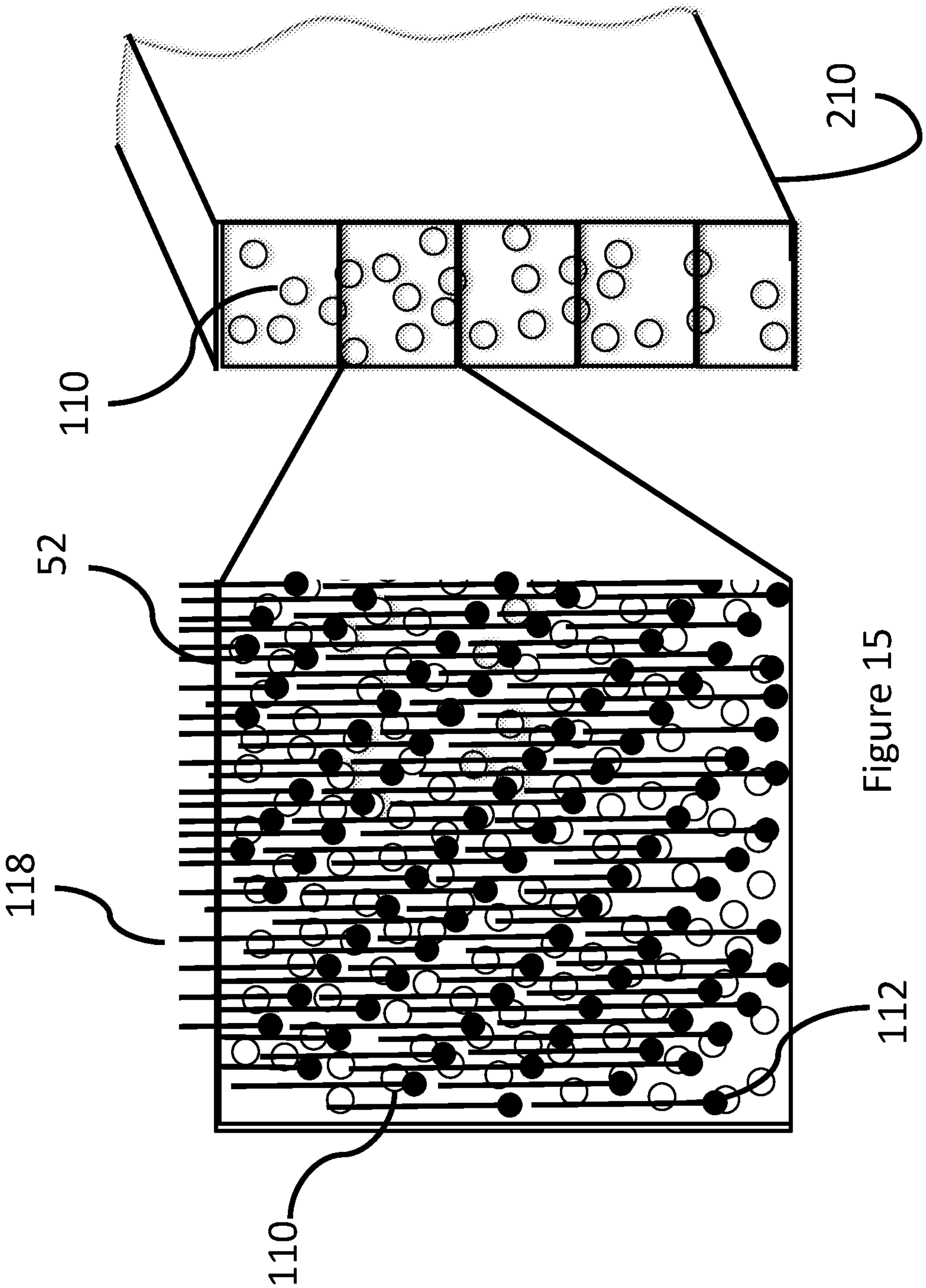
FIG. 15 is a conceptual cross-sectional representation of a planar face of any layer of the beam scanner.

FIG. 15 is a conceptual plan view representation of a planar face of any layer of either beam scanner. It is also shown in cross-section 210 to illustrate the three-dimensional nature of a beam scanner. Quantum dots 110 are distributed on the surface of the at least one substrate plate within the beam scanner 52 and thus within the volume of the beam scanner. The stack of plates are electrically connected by conductive traces 18 and metal vias 112 to the operational guidance system.

Figure 16:
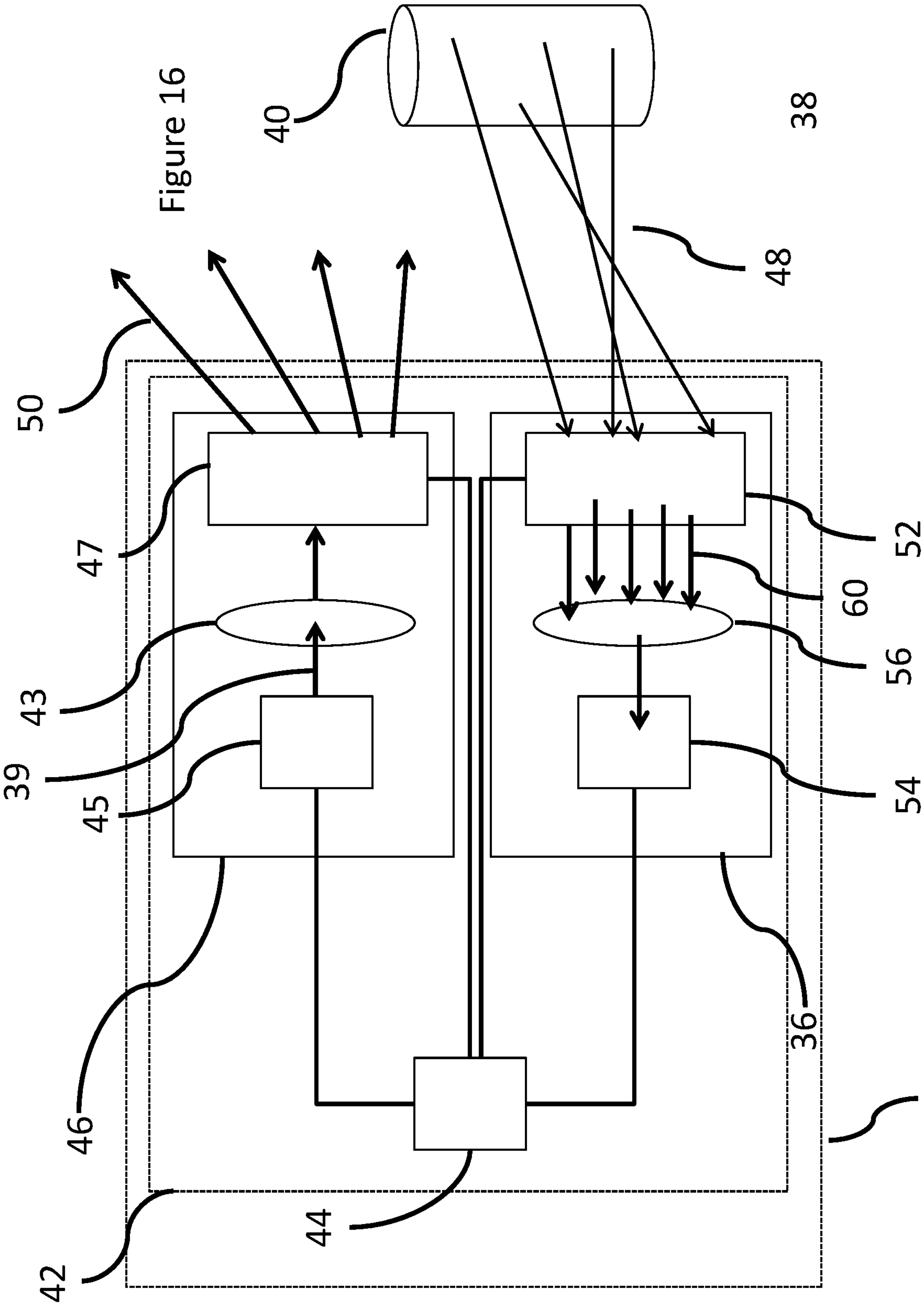
FIG. 16 is a conceptual view of a vehicle containing a quantum dot phased array LIDAR system.

FIG. 16 provides a conceptual drawing of an autonomous vehicle 34 utilizing a beam steering receive module 36 in its quantum dot phased array LIDAR system 42 with optional optical conveying devices 43 and 56. The quantum dot phased array LIDAR system 42 has a receive module 36 and a transmit module 46. (Here, there is a first beam scanner 47 functioning as an electromagnetic beam transmitter in the transmit module 46 and a second beam scanner 52 functioning as an electromagnet beam receiver in a receive module 36.) Both beam scanners in this embodiment are operating as transmissive beam steering elements (operating in the transmissive mode) although they could both operate as reflective beam steering elements (operating in the reflective mode), or the system could operate with one beam scanner in each mode. The quantum dot phased array LIDAR system 42 is connected to the operational guidance system 44 for controlling the acceleration, braking and steering of the vehicle 34.

Still looking at FIG. 16 it can be seen that the transmit module 46 has an electromagnetic beam emitter 45 that transmits an output electromagnetic beam 39 through a first optional optical conveying device 43. This enables the transmission of the emitted output electromagnetic beam 39 to the first beam scanner 47 that creates the user selectable distribution of the outgoing interrogating electromagnetic beams 50. The reflected interrogating electromagnetic beams 48, after reflection from a surface/object 40 in the external environment 38, are collected and steered by the second beam scanner 52 of the receive module 36. The steered beam 60 is communicated to the detector 54, through a second optional optical conveying device 56. The detector 54 transmits an output signal to the guidance system 44. The beam scanners 47 and 52 used in this embodiment have at least one substantially transparent and partially conductive substrate plate having at least one generally planar face with a series of particles affixed as described herein. It is to be noted, as discussed above, operation of a quantum dot phased array LIDAR system 42 as detailed herein, need only utilize a beam scanner acting in the receive mode within the receive module to realize the advantages of the present invention, as the emitted output electromagnetic beam 39 need not originate form a beam scanner but rather from any of a host of other electromagnetic beam generators.

The ideal embodiment quantum dot phased array LIDAR system 42, possesses a control signal with a scan rate determined as the number of control signals generated per unit time, with the scan rate at a frequency between 100 kHz and 10 GHz. Ideally, the quantum dot phased array LIDAR system 42 system (FIGS. 9*a* and 9*b*) would reflect emitted signals from objects in the environment 38 and have a field of view (FOV) defined by the angle through which these reflected electromagnetic signals 48 are collected through an angle 20, up to and including 180 degrees, relative to the device face.

The quantum dot phased array LIDAR system further comprises a beam scanner 52 (for receiving) that is operationally connected to a controller 44 to supply the lens input aperture signals 60 that are steered to the lens 56 by the beam scanner 52 so that the now directed signals are received by the detector 54. The detector 54 is a diode or other device supplying the processing unit of the AV with an output signal from the detector. That output signal is proportional to a time delay between electromagnetic signal pulse generation and the electromagnetic signal pulse reflection from the external environment. The particles in the beam scanner (FIG. 15) can be arranged on, in or next to any number of dielectric plates that are in electrical contact with one another and with the controller 44.

Ideally, the device will modulate the beam path through the stack 103 as conceptually presented in FIG. 11. Modulation is achieved by modified polarization of the particles. The polarization change is directly proportional to the applied control signals 78 or 80 (FIG. 12), in each segment of the device to collect and direct the incoming signals onto a detector at frequencies of 100 kHz to 500 MHz.

The bean scanner aperture will enable an IFOV which will be fixed to accommodate 2 mRadians or better, which will enable low error rates nominally on the order of 1.5 kHz, to enable built-in isolation and discrimination. The ideal embodiment will contain cells within the device that can be addressed independently of their neighbors, providing a pixel density of 8-10 megapixels across the 6"×6" device face. The device so assembled, would very easily advance AV sensing technology by solving all of the technical problems presently preventing widespread deployment, increasing the maximum speed of the vehicle, increasing the sensitivity, requiring a lower power laser source (up to 100 times less), and finally increasing the signal to noise ratio of the entire system.

Now that the basic quantum dot phased array LIDAR system, its capability and is operation has been discussed, the enhanced embodiment of it will now be disclosed. This enhanced embodiment utilizes unique fingerprint signatures incorporated into the interrogating electromagnetic beams. This accomplishes two things. First, it allows the receive module to execute incoming reflected interrogating electromagnetic beam discrimination. This prevents the inclusion of spurious signals from other vehicles or sources emitting electromagnetic radiation. Second, it enhances the performance time of the system by eliminating computational overhead associated with azimuth angle and distance calculations.

Using a vertical external (or internal) cavity surface-emitting laser (VECSEL) for instance, and especially a mode-locked integrated external-cavity surface emitting laser, would, as a result of so-called quantum noise, enable fingerprint recognition of individual pulses. This would enable discrimination detection between many external pulse sources (other vehicles) occupying the same spatial volume. Thus enabled, the vision system would ignore the pulses not containing the pre-recorded quantum noise footprint, greatly reducing or even eliminating the error rate/or false positive rates. This would be most efficacious in the picosecond or femtosecond pulse regimes. The other advantage of these laser structures is their very small size, weight and power consumption profiles. Simply stated, only signals originating from this discrete unit will be processed by it.

In returning to the previously mentioned concept of computational imaging, it is easy to see by extension that this approach can be generalized to include any laser onto which noise, a frequency chirp or an amplitude chirp can be coded, by a variety of available methods, the returning signal further decoded by analyzing the resultant beat frequency between the encoded chirp and the received chirp contained in to the pulses reflected from the external environment. A vehicle, so equipped, would be capable of processing hundreds of thousands of emitted pulses simultaneously "in flight" to the external environment as well as those returning from the external environment back to the detector, all of which would be encoded with not just pulse discrimination, but also emitted angle data, which would in theory enable an embodiment wherein a suitably equipped vehicle could detect returned pulses with a simple device. In the case of automobiles, the windows as well as the windscreen (windshield) could be imparted with an array for detecting the return pulses, thereby increasing the clear aperture of detection by orders of magnitude. The preferred embodiment of the computational imaging solution would be constructed of a signal emitter with a chirped signal generator, which will create a unique signal for each emitted pulse, encoded for emitted angle and a time stamp for calculating the time interval between emission and detection. The components of the beam scanning architecture are not changed in terms of arrangement of subsystems or in fact the total compilation of the various subsystems, rather the inventive step lies in the inclusion of the emitted signal code as a feedback signal provided to the signal detection apparatus (the detector). The detector will discriminate between successively emitted pulses, pulses from other vehicles, and also pulses emitted at different angles from the signal emitter, which will enable calculation of not only distance, but direction. This innovative discrimination is achieved through the use of the coordination between the encoding at the emitter and the detector. When the pulses coincide with one another, the beat frequency will appear in the comparator circuit. This means the detected pulse will have been identified and its origin trajectory matched with the sending unit's signal to form a complete data set for each received pulse: time of flight, angle and azimuth. With the ability to encode many emitted pulses, the point cloud density obtainable with this approach is orders of magnitude more detailed and will have been collected at a faster rate, enabling safer, faster operation of the vehicle. The chirped laser signal can be generated in any number of ways common in the industry. In another embodiment, the use of the quantum dot scheme for detection, enables high resolution data collection by choosing frequencies that are naturally in resonance with the relaxation mode of the individual quantum dots. In the preferred embodiment of this invention, the QD system exhibits a natural resonance at a frequency of 30 MHz. This creates a signal response in the detector over 10 times higher than detector responses at other frequencies. It is likely this is the result of Auger scattering recombination effects. The change in the permittivity of the particles will thereby affect a larger change in the electromagnetic waves reflected from the environment which in turn results in a much higher signal to noise ratio. The higher signal to noise enables faster more accurate detection of incoming signals adding to the overall performance of the system and the vehicle under operational guidance.

Additionally, the introduction of a secondary frequency mixed with the native frequency of the signal emitter (a so-called chirped pulse) enables highly efficient pulse discrimination for many pulses to be "in flight" at one time, limited only by the available pulse repetition rate of the signal emitter. For example, in the case of a laser operating at 20 MHz, the system could easily accommodate 1,000 pulses in flight, with each pulse being coded for angle, azimuth and time. The detector can then operate in either random access pointing mode or raster mode at a switching frequency of 30 MHz, detecting the pulses as rapidly as they arrive, without regard for pointing direction, or any other reference datum because the necessary information for locating objects in the external environment is already contained within the chirping signal supplied to the receiver unit from the sending unit. Once a signal is received the comparator can match the received frequency pattern with the data from the send unit by looking for the beating between the two frequencies without regard to any time shifting resultant from the signal's round trip from vehicle sending unit into external environment and back to receiver unit. For clarity, the source of the encoding frequency can be a simple algorithm that utilizes the random signal noise (which can be a laser) to create a wide array of frequencies with which the unit may encode the necessary identification and position data.

It is worth highlighting that the proposed pulse encoding or fingerprinting is novel both in its derivation and also in the capabilities it imbues the system employing the scheme. It goes well beyond the NATO coding for discrimination, by adding discrimination to a full set of coordinate data and in the method of detecting the signal's presence on the reflected light pulse(s) by looking for a beating pattern, which is easily identified by computer algorithm.

Figure 17:
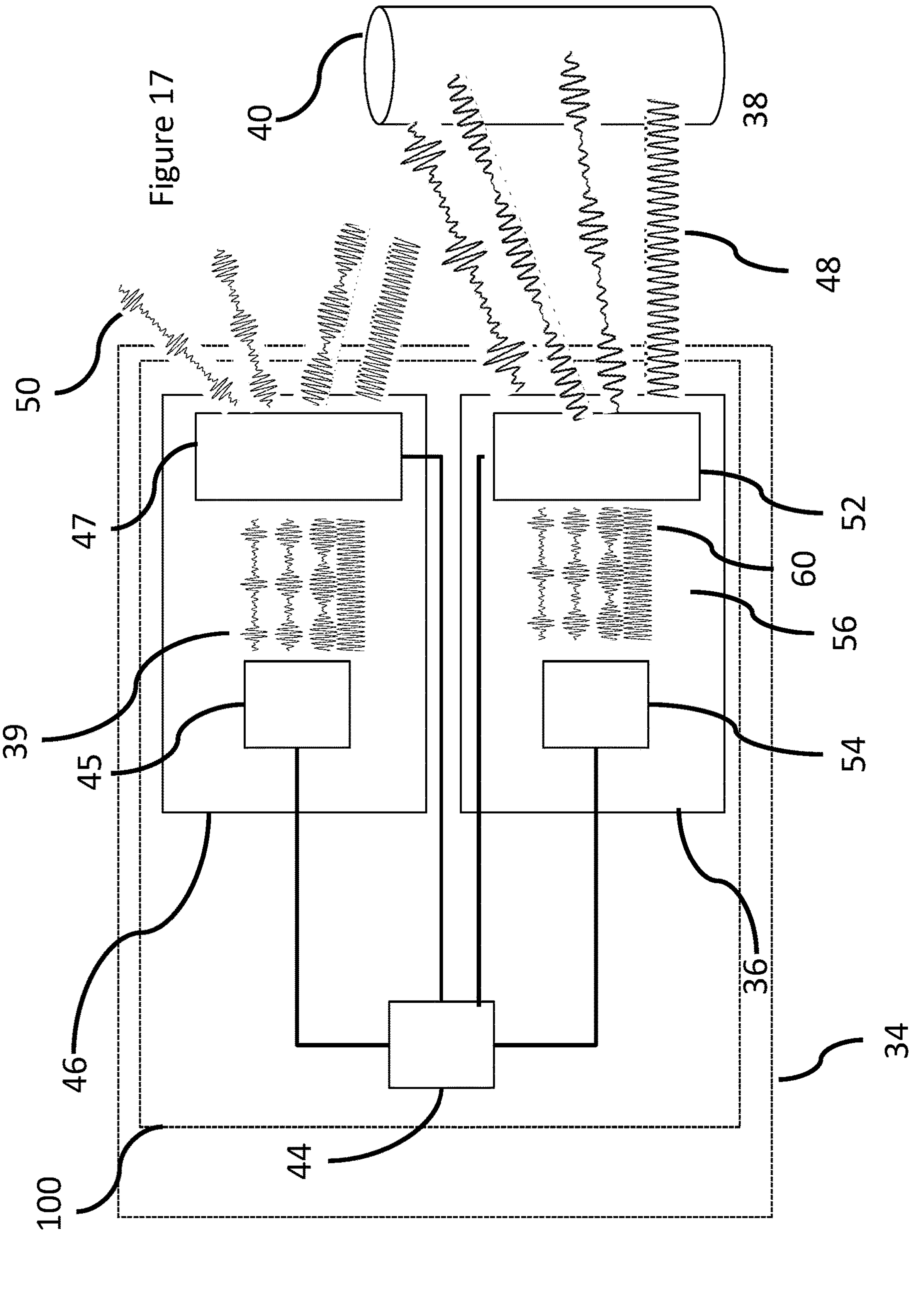
FIG. 17 is a conceptual view of the vehicle 34 containing pulse discriminator system.

The enhanced quantum dot phased array LIDAR system can best be illustrated with reference to FIG. 17. The autonomous vehicle 34 utilizes an enhanced quantum dot phased array LIDAR system 100 operably connected to a guidance system 44 for controlling the braking and steering of the vehicle 34. The enhanced quantum dot phased array LIDAR system 100 has a receive module 36 and a transmit module 46, each without the optional optical conveying devices. There is a first beam scanner 47 functioning as an electromagnetic beam transmitter in the transmit module 46 and a second beam scanner 52 functioning as an electromagnet beam receiver in a receive module 36. Both beam scanners in this embodiment are operating as transmissive beam steering elements (operating in the transmissive mode) although they could both operate as reflective beam steering elements (operating in the reflective mode), or the system could operate with one beam scanner in each mode. The electromagnetic beam emitter 45 emits output electromagnetic beams with a base frequency that it internally mixes with a unique frequency, thereby chirping the base frequency creating a superposition of both frequencies that it then sends as an electromagnetic beam 39, with a uniquely modified frequency to the first beam scanner 47. It simultaneously sends this unique frequency data to the guidance system 44. These newly created unique outgoing interrogating electromagnetic beams 50, each of which is now frequency chirped and "fingerprinted" for later identification, enter the first beam scanner 47 where they are also coded with time of emission, angle of emission and azimuth of emission data provided by (and stored within) the guidance system 44 to the first beam scanner 47. The coded, reflected unique interrogating electromagnetic beams 48, after reflection from a surface/object 40 in the external environment 38, are collected and steered by the second beam scanner 52 of the receive module 36. The steered coded, unique interrogating electromagnetic beam 60 is communicated to the detector 54. Note, that the guidance system 44 combines the unique frequency data it received from the beam emitter 45 with the time of emission, angle of emission and azimuth of emission data that it provided to the first beam scanner 47 to the detector 54. The detector 54 with its integrated comparator now has a simplified computational task of discriminating incoming beams, identifying the incoming steered coded, unique interrogating electromagnetic beams 60 with their counterpart unique outgoing interrogating electromagnetic beams 50, so as to algorithmically map the external environment 38 about the vehicle and report it to the guidance system 44.

The beam scanners 47 and 52 used in this embodiment have at least one substantially transparent and partially conductive substrate plate having at least one generally planar face thereon with a series of particles affixed as described herein. It is to be noted, as discussed above, operation of the enhanced quantum dot phased array LIDAR system 100 as detailed herein, need only utilize a beam scanner acting in the receive mode within the receive module to realize the advantages of the present invention, as the emitted output electromagnetic beam 39 need not originate from a beam scanner but rather from any electromagnetic beam generating source.

Ideally, the wavelength for which the device is optimized will be in the so-called eye safe region of the electromagnetic spectrum, preferably at or around 1500 nm, although the device need not be restricted to any particular wavelength. Each application will be optimized based on end-user goals. The preferred embodiment for AV applications with LIDAR sensing technology is a laser diode or other laser as described above, laser operating from 800 nm to 2500 nm, but ideally at 1550 nm, with a variable pulse repetition frequency from 100 kHz to 1 MHz or beyond. The reflected signal mode is the preferred mode of operation for the device and as such the preferred embodiment of the invention includes cylindrical lenses, one for each axis, to enable collection of incoming signals, captured by the beam scanner and steered by the application of control signals or passively by virtue of the design, without external control signals, to the input aperture of the downstream optical conveying devices, which subsequently focus the signals onto the detector, which in the preferred embodiment is a specialized compound semiconductor device, but could just as easily be an inexpensive PIN diode, with less than 20 photon sensitivity. This input would be converted into information about the AV's environment and then into control inputs to alter the AV's trajectory, course, speed or velocity alone or in concert.

Naturally, the particles within the scanner, on, in or near its component parts, can be arranged in predetermined patterns to affect a greater change in the electronic environment within the scanner, thus imparting a higher degree of deflection to the incident signals. The operational guidance system previously described would also have a field of regard that corresponds to an input aperture from 2 mm up to 1 meter in diameter, based upon the dimensions of said substrate plate. Furthermore, an ideal embodiment of a module (transmit and receive) would include a signal emitter, a detector, a scanner and controller, as previously described, where all are solid-state devices. This in conjunction with a high scan speed would enable time delay proportional signals to be generated with the highest point cloud density wherein at all times during operation, there will be at least two sequentially emitted electromagnetic signal pulses that have not yet been collected by said beam scanner. Simply stated, there will always be two scan signals (laser pulses) in flight.

The beam scanner comprises particles that are quantum dots affixed on the substrate plate, or therein the substrate plate or a combination thereof. This can be deployed as described, but also as an integrated set of components as seen in FIG. 16. Here, it can be seen that an operational guidance system (comprising the vision system and the navigational system) for providing an output signal responsible for the moving control of an autonomous vehicle has the following:

no moving parts;

is made of at least one signal emitter 45 generating the electromagnetic signal 39 to at least one optional first optical conveying device 43;

at least one transmit beam scanner 47 for transmitting the outgoing electromagnetic signal 50 to be reflected by the environment 38;

at least one first controller applying a first control signal to the transmit beam scanner 47 to direct the electromagnetic signal 50 to the environment 38 external to the autonomous vehicle 34;

at least one receive beam scanner 52 for the collection of the electromagnetic signal reflected by an environment 38 external to the autonomous vehicle 34;

at least one second controller applying a second control signal to the receive beam scanner 52 to direct the collected electromagnetic signal to at least one collecting optic;

at least one detector;

at least one optional second lens positioned between the receive beam scanner and detector;

wherein the collecting optic or lens communicates the collected electromagnetic signal onto the detector;

wherein the transmit and receive second beam scanners are substantially transparent and partially conductive substrate plates having at least one generally planar face thereon each plate, with a series of particles affixed with each plate, each of the particles having an arbitrary size, and each of the particles possessing an induced dipole moment, and each of the particles in electrical contact with the partially conductive first and second substrate plates. And also, where the detector generates an output signal communicated to the navigation system of the autonomous vehicle.

It is recognized that the primary components for the transmission and reception of electromagnetic signals/pulses/beams are identical to one another. The only difference between the receive module and the transmit modules is the direction of the signal propagation, a detector where an emitter would otherwise be and the operational position of some of the optional optical components. Ideally, the output signal generated by the receive module of this embodiment will be proportional to a time delay between when the first electromagnetic pulse is generated by the electromagnetic beam emitter of the transmit module, and when the first electromagnetic pulse, as reflected by the environment, is received by the receive module. Part of the novelty of this vision system is that at all times during operation, there will be at least two sequentially emitted electromagnetic pulses that have not yet been collected at the receive beam scanner.

The laser scanning features of the present innovation rely upon the application of control signals for variable mode operation and can be also hard-wired into the beam scanner's substrate plate by judicious creation of zones of polarization within the substrate plate through which the light travels. The electromagnetic environment is altered by the creation of zones of graduated concentrations of polarizable moieties, exhibiting a permanent dipole moment, or those that are electrically neutral in their quiescent state, by virtue of the conditions used in the electrospray deposition, which create covalent bonding between the substrate and the particles, molecules or clusters of molecules, depending upon the degree of polarization desired.

The device in its preferred embodiment, consists of a laser source, being scanned across the field of view at a maximum scan rate in order to put at least two pulses into flight toward the target in order to increase the signal to noise ratio, which has the added benefit of increasing the resolution of the picture produced by the reflected laser radiation used for obstacle detection, lane maintenance and obstacle/collision avoidance and target acquisition. In the reflective beam steering example, the innovation enables a compelling commercial solution by delivering a LIDAR solution capable of interrogating the surrounding environment enabling safe, high-speed operation of the vehicle, in a performance window very much like that enjoyed by vehicles presently commonly in use.

Although discussed as a single beam scanner, it is understood that there may be multiple transmit modules and multiple receive modules placed about the vehicle to paint the complete 360 picture of the external environment of that vehicle to the navigation system.

Introduction of particles or polarizable molecules into a substantially transparent, partially conductive plate, naturally alter the electronic behavior (dipole moment) of the host material, if not at least, its internal electronic environment. It is by controlling how these particles (quantum dots in the preferred embodiment) are supplied to the plate or applied to the surface of the plate that the present innovation creates a device with no moving parts and an arbitrarily large aperture, capable of controllably steering incident electromagnetic radiation. A dispersion of particles applied to a transparent partially conductive substrate plate will, under suitable stimulation create a spatial light modulator that is optically (also electric and/or magnetic) addressable beam steering device. Utilizing multiple layers of this construction, one can create an array capable of so-called 2Pi modulo wave front steering at very high efficiency, high switching frequency and utilizing a variety of variable frequencies to accomplish the desired operational modes of the device or system.

In returning to the previously mentioned concept of computational imaging, it is easy to see by extension that this approach can be generalized to include any laser onto which noise, a frequency chirp or an amplitude chirp can be coded, by a variety of available methods, the returning signal further decoded by analyzing the resultant beat frequency between the encoded chirp and the received chirp contained in to the pulses reflected from the external environment. A vehicle, so equipped, would be capable of processing hundreds of thousands of emitted pulses simultaneously "in flight" to the external environment as well as those returning from the external environment back to the detector, all of which would be encoded with not just pulse discrimination, but also emitted angle data, which would in theory enable an embodiment wherein a suitably equipped vehicle could detect returned pulses with a simple device. In the case of automobiles, the windows as well as the windscreen (windshield) could be imparted with an array for detecting the return pulses, thereby increasing the clear aperture of detection by orders of magnitude. The preferred embodiment of the computational imaging solution would be constructed of a signal emitter with a chirped signal generator, which will create a unique signal for each emitted pulse, encoded for emitted angle and a time stamp for calculating the time interval between emission and detection. The components of the beam scanning architecture are not changed in terms of arrangement of subsystems or in fact the total compilation of the various subsystems, rather the inventive step lies in the inclusion of the emitted signal code as a feedback signal provided to the signal detection apparatus (the detector). The detector will discriminate between successively emitted pulses, pulses from other vehicles, and also pulses emitted at different angles from the signal emitter, which will enable calculation of not only distance, but direction. This innovative discrimination is achieved through the use of the coordination between the encoding at the emitter and the detector. When the pulses coincide with one another, the beat frequency will appear in the comparator circuit. This means the detected pulse will have been identified and its origin trajectory matched with the sending unit's signal to form a complete data set for each received pulse: time of flight, angle and azimuth. With the ability to encode many emitted pulses, the point cloud density obtainable with this approach is orders of magnitude more detailed and will have been collected at a faster rate, enabling safer, faster operation of the vehicle. The chirped laser signal can be generated in any number of ways common in the industry. In another embodiment, the use of the quantum dot scheme for detection, enables high resolution data collection by choosing frequencies that are naturally in resonance with the relaxation mode of the individual quantum dots. In the preferred embodiment of this invention, the QD system exhibits a natural resonance at a frequency of 30 MHz. This creates a signal response in the detector over 10 times higher than detector responses at other frequencies. It is likely this is the result of Auger scattering recombination effects. The change in the permittivity of the particles will thereby affect a larger change in the electromagnetic waves reflected from the environment which in turn results in a much higher signal to noise ratio. The higher signal to noise enables faster more accurate detection of incoming signals adding to the overall performance of the system and the vehicle under operational guidance.

Additionally, the introduction of a secondary frequency mixed with the native frequency of the signal emitter (a so-called chirped pulse) enables highly efficient pulse discrimination for many pulses to be “in flight” at one time, limited only by the available pulse repetition rate of the signal emitter. For example, in the case of a laser operating at 20 MHz, the system could easily accommodate 1,000 pulses in flight, with each pulse being coded for angle, azimuth and time. The detector can then operate in either random access pointing mode or raster mode at a switching frequency of 30 MHz, detecting the pulses as rapidly as they arrive, without regard for pointing direction, or any other reference datum because the necessary information for locating objects in the external environment is already contained within the chirping signal supplied to the receiver unit from the sending unit. Once a signal is received the comparator can match the received frequency pattern with the data from the send unit by looking for the beating between the two frequencies without regard to any time shifting resultant from the signal’s round trip from vehicle sending unit into external environment and back to receiver unit. For clarity, the source of the encoding frequency can be a simple algorithm that utilizes the random signal noise (which can be a laser) to create a wide array of frequencies with which the unit may encode the necessary identification and position data.

It is worth highlighting that the proposed pulse encoding or fingerprinting is novel both in its derivation and also in the capabilities it imbues the system employing the scheme. It goes well beyond the NATO coding for discrimination, by adding discrimination to a full set of coordinate data and in the method of detecting the signal’s presence on the reflected light pulse(s) by looking for a beating pattern, which is easily identified by computer algorithm.

Figure 18:
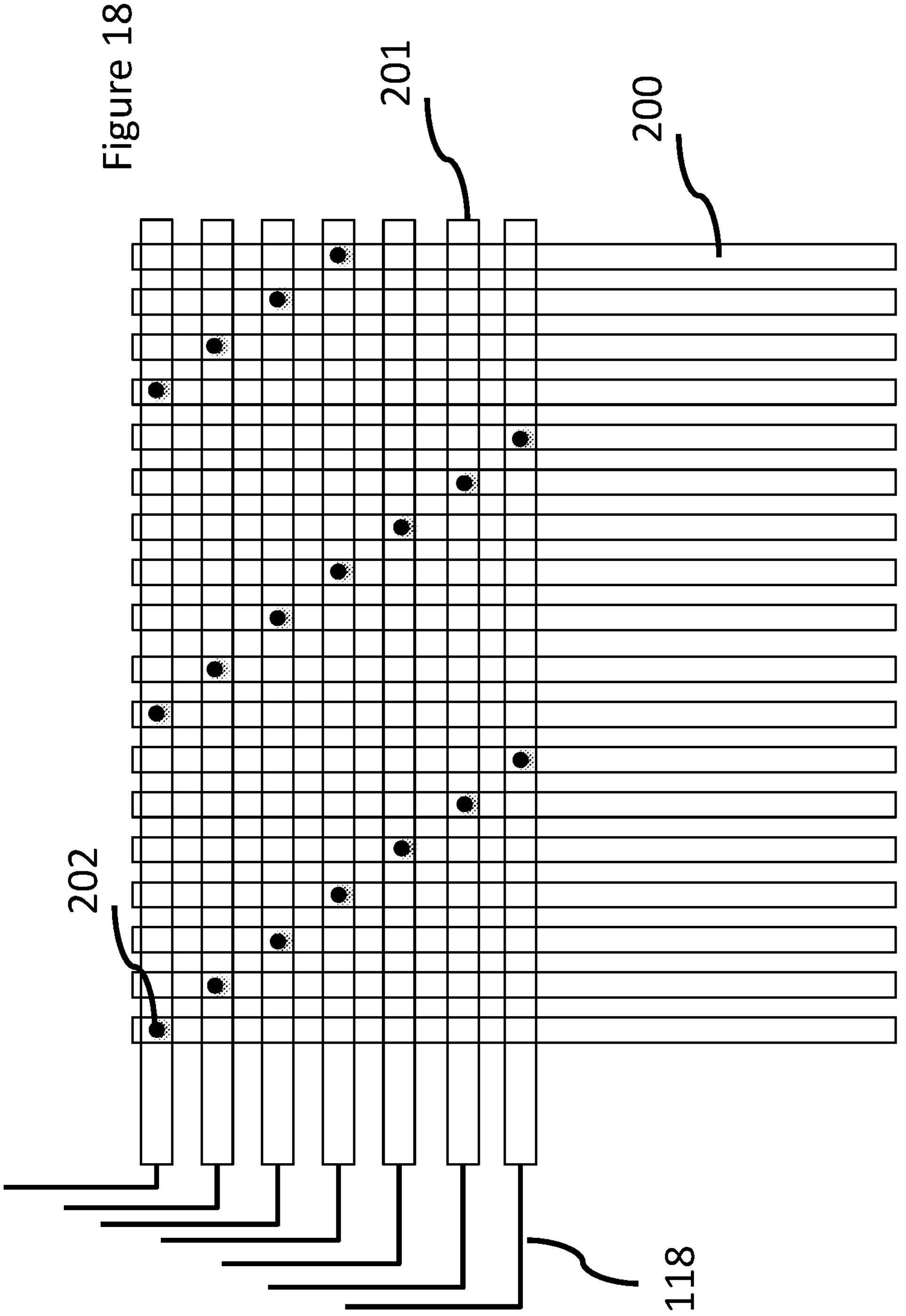
FIG. 18 is a conceptual view of the integrated single layer quantum dot phase shifter and its electrical connectivity.

FIG. 18 illustrates the schematic layout of a section of a beam scanner. The beam scanner can be realized as a quantum dot phase shifting module, also known as quantum dot phased array, although the particles in operational contact with the substrate plates need not be quantum dots. In the preferred embodiment, this structure will be duplicated into multiple, stacked layers as implied in FIG. 15. These stacked plates will be in operational contact with the guidance system through layers of transparent conductive traces, 201, in a matrix, connected through metalized vias, 202, carrying control signals from the guidance system or optionally from intermediate controllers carried by electrical traces, 118. These signals ultimately affect the local electronic and magnetic environment of the quantum dots in operational contact with the phase shifter bus lines 200, responsible for carrying the said electrical signals to each pixel or region within the beam scanner. These signals create changes in the polarizability and permeability of the particle structures thereby shifting the phase of incoming incident electromagnetic waves to be steered into or out of the lidar system. The arrangement of the contact vias, 202, illustrates the repeating pattern where the same signal is supplied according to a predetermined spatial frequency. This design optimizes the so-called 2pi modulo steering that is common to beam steering devices employing more conventional techniques for creating optical path differences.

The operation of the preferred embodiment of the second beam scanner 52 acting as a receive module 36 of a vision system 42 to steer a collected or reflected beam 50 into/onto a detector 54 through an optional conveying optic device 56, for the eventual transmission of a control signal to a navigation system 44 of an autonomous or semi-autonomous vehicle 34 consists of the following steps:

1) Installing at least one beam scanner on an autonomous or semi-autonomous vehicle 34 at a location with a field of view of an external environment, the beam scanner comprising at least one substantially transparent and partially conductive substrate plate having at least one generally planar face with a series of affixed particles where each of the particles are of an arbitrary size, and where each of the particles possess an induced dipole moment, and where each of the particles are in electrical contact with the partially conductive substrate plate;
2. Transmitting an electromagnetic beam from the vehicle into the external environment;
3. Reflecting the electromagnetic beam from an object or surface 40 located in the external environment 38;
4. Receiving the reflected electromagnetic beam 50 at the second beam scanner 52; and
5. Converting the reflected electromagnetic beam 50 at the second beam scanner 52 into a steered electromagnetic beam 60;
6. Communicating the steered electromagnetic beam 60 into the detector 54.

Optionally, after step 5, transmitting the steered electromagnetic beam 60 through an optic conveying device 56 before communicating the steered electromagnetic beam into the detector 54.

In the preferred embodiment, the converting of the reflected electromagnetic beam 50 into the steered electromagnetic beam 60 of step 5 is accomplished by transmissive steering through the beam scanner 52.

In an alternate embodiment, the converting of the reflected electromagnetic beam 50 into the steered electromagnetic beam 60 of step 5 is accomplished by reflective steering from the beam scanner 52.

It is important to understand that the novelty of the present invention enables the operation of other components in an autonomous vehicle navigation system that is not now possible. Specifically, the speed of the operation of the beam scanner in the receive module allows for random access steering, whereby the deflection of the beam occurs about the center of the un-deflected beam, very much like a so-called, EO-Deflector, but also along a series of zero order paths in near simultaneous fashion. This is important because most present-day navigation systems lack the ability to jump to a region of interest that is not sequential relative to beam motion. Furthermore, the ability of region of interest specificity also enables a whole host of computational imaging devices both for vision systems and for systems outside the scope of the present disclosure.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture, but instead can be implemented on any suitable hardware, firmware, and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

Having thus described the invention, what is claimed as new and desired to be secured by Letters Patent is as follows:

1. An electromagnetic signal receiving module for use in an operational guidance system for providing an output signal to a processing unit responsible for the generation of a drive signal for the moving control of an autonomous vehicle, said electromagnetic signal receiving module comprising:

at least one beam scanner for the collection of an electromagnetic signal pulse sent by a signal emitter and reflected by an environment external to said autonomous vehicle;

wherein said beam scanner is a substantially transparent and partially conductive substrate plate having at least one generally planar face thereon with a series of particles affixed with said plate, each of said particles of an arbitrary size, and each of said particles possessing an induced dipole moment, and each of said particles in electrical contact with said partially conductive substrate plate;

wherein said signal receiver generates an output signal communicated to said processing unit of said autonomous vehicle.

2. The electromagnetic signal receiving module of claim 1, further comprising: a controller applying an external control signal to said beam scanner to direct said collected electromagnetic signal pulse, to at least one lens;

said at least one lens positioned between said beam scanner and a signal receiver, said at least one lens communicating said collected electromagnetic signal pulse onto said signal receiver.

3. The electromagnetic signal receiving module of claim 2 further comprising:

at least one signal emitter generating said electromagnetic signal pulse to illuminate said environment external to said autonomous vehicle.

4. The electromagnetic signal receiving module of claim 3 wherein said electromagnetic signal pulse emitted has a wavelength between 800 nm and 2000 nm, and wherein the signal emitter is chosen from the set of light sources comprising a diode laser, MIXSEL, VECSEL, VCSEL, diode pumped solid state or fiber laser with a pulse duration between 50 nano seconds and 0.5 femto seconds.

5. The electromagnetic signal receiving module of claim 2 wherein said controller's external control signal has a scan rate determined as the number of control signals generated per unit time, said scan rate having a frequency between 10 KHz and 10 GHz.

6. The electromagnetic signal receiving module of claim 1 wherein said output signal generated by said signal receiver, is proportional to a time delay between when said electromagnetic signal pulse is generated by said signal emitter and when said electromagnetic signal pulse as reflected by said environment is received by said signal receiver.

7. The electromagnetic signal receiving module of claim 1 wherein said signal emitter has an electromagnetic signal pulse repetition frequency of 1 kHz to 100 MHz.

8. The electromagnetic signal receiving module of claim 1 wherein said series of particles are affixed thereon said substrate plate.

9. The electromagnetic signal receiving module of claim 1 wherein said series of particles are affixed therein said substrate plate.

10. The electromagnetic signal receiving module of claim 1 wherein in said series of particles, each said particle possesses a permanent dipole moment.

11. The electromagnetic signal receiving module of claim 1 wherein said series of particles are arranged in a predetermined pattern.

12. The electromagnetic signal receiving module of claim 1 wherein the field of regard of the beam scanner corresponds to an input aperture from 2 mm to 1 meter in diameter, based upon dimensions of said substrate plate.

13. The electromagnetic signal receiving module of claim 7 wherein at all times during operation, there will be at least two sequentially emitted electromagnetic signal pulses that have not yet been collected by said beam scanner.

14. The electromagnetic signal receiving module of claim 1 wherein said particles are series of quantum dots.

15. The electromagnetic signal receiving module of claim 11 wherein said series of quantum dots are affixed therein or thereon said substrate plate.

16. An operational guidance system for providing an output signal to a processing unit responsible for the generation of a drive signal for the moving control of an autonomous vehicle, said operational guidance system having no moving parts, comprising:

at least one signal emitter generating said electromagnetic signal to at least one lens;

at least one said beam scanner for directing said electromagnetic signal on to an input aperture of a collecting or focusing optic;

at least one first beam scanner for sending said electromagnetic signal to be reflected by said environment;

at least one first controller applying a first external control signal to said first beam scanner to direct said electromagnetic signal to said environment external to said autonomous vehicle;

at least one second beam scanner for the collection of said electromagnetic signal reflected by an environment external to said autonomous vehicle;

at least one second controller applying a second external control signal to said second beam scanner to direct said collected electromagnetic signal to at least one collecting optic;

said at least second lens positioned between said second beam scanner and a signal receiver, said collecting optic or lens communicating said collected electromagnetic signal onto said signal receiver;

at least one said signal receiver; and wherein said first and said second beam scanner are substantially transparent and partially conductive substrate plates having at least one generally planar face thereon each said plate, with a series of particles affixed with each said plate, each of said particles of an arbitrary size, and each of said particles possessing a induced dipole moment, and each of said particles in electrical contact with said partially conductive first and second substrate plates;

wherein said signal receiver generates an output signal communicated to said processing unit of said autonomous vehicle.

17. The operational guidance system of claim 16 wherein said output signal generated by said signal receiver, is proportional to a time delay between when said first electromagnetic signal pulse is generated by said signal emitter and when said first electromagnetic signal pulse as reflected by said environment is received by said signal receiver.

18. The operational guidance system of claim 17 wherein at all times during operation, there will be at least two sequentially emitted electromagnetic signal pulses that have not yet been collected said beam scanner.

19. The operational guidance system of claim 18 wherein said particles are quantum dots affixed thereon or therein a substrate plate.

* * * * *